US012413891B2

(12) United States Patent
Xu et al.

(10) Patent No.: US 12,413,891 B2
(45) Date of Patent: Sep. 9, 2025

(54) OPEN EARPHONES

(71) Applicant: SHENZHEN SHOKZ CO., LTD., Guangdong (CN)

(72) Inventors: Jiang Xu, Shenzhen (CN); Zeying Zheng, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 162 days.

(21) Appl. No.: 18/365,965

(22) Filed: Aug. 4, 2023

(65) Prior Publication Data

US 2024/0147130 A1 May 2, 2024

Related U.S. Application Data

(63) Continuation of application No. PCT/CN2023/079400, filed on Mar. 2, 2023.

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.
*H04R 1/10* (2006.01)

(52) U.S. Cl.
CPC ........... *H04R 1/105* (2013.01); *H04R 1/1016* (2013.01); *H04R 1/1066* (2013.01)

(58) Field of Classification Search
CPC ....... H04R 1/105; H04R 1/1016; H04R 1/066
USPC .......................................................... 381/390
See application file for complete search history.

(56) References Cited

U.S. PATENT DOCUMENTS

| | | | | |
|---|---|---|---|---|
| 7,050,598 | B1 | 5/2006 | Ham | |
| 12,231,838 | B2 * | 2/2025 | Costa | H04R 1/105 |
| 2007/0009133 | A1 | 1/2007 | Gerkinsmeyer | |
| 2010/0239114 | A1 * | 9/2010 | Wada | A61B 5/6817 381/380 |

(Continued)

FOREIGN PATENT DOCUMENTS

| | | | |
|---|---|---|---|
| CN | 212909891 | U | 4/2021 |
| CN | 113573215 | A | 10/2021 |

(Continued)

OTHER PUBLICATIONS

The Extended European Search Report in European Application No. 23881041.0 mailed on Jul. 7, 2025, 15 pages.

*Primary Examiner* — Sean H Nguyen
(74) *Attorney, Agent, or Firm* — Metis IP LLC

(57) ABSTRACT

The present disclosure provides an open earphone comprising: a sound production component including a transducer and a housing accommodating the transducer; and an ear hook including a first portion of the ear hook and a second portion of the ear hook. The first portion of the ear hook is hung between an auricle and a head of a user, and the second portion of the ear hook extends towards a side of the auricle away from the head and connects with the sound production component to place the sound production component in a position near an ear canal but not blocking the ear canal, the housing and the first portion of the ear hook clamp the auricle of the user, and provide a clamping force in a range of 0.03 N to 1 N to the auricle of the user.

16 Claims, 11 Drawing Sheets

(56) References Cited

U.S. PATENT DOCUMENTS

| | | | | |
|---|---|---|---|---|
| 2012/0140976 | A1* | 6/2012 | Birger ................ | H04M 1/6066<br>381/381 |
| 2020/0196062 | A1 | 6/2020 | Zhang | |
| 2021/0165249 | A1 | 6/2021 | Wang et al. | |
| 2022/0124423 | A1 | 4/2022 | Zheng et al. | |

FOREIGN PATENT DOCUMENTS

| | | | |
|---|---|---|---|
| CN | 214429681 | U | 10/2021 |
| CN | 215682610 | U | 1/2022 |
| CN | 114286228 | A | 4/2022 |
| CN | 217011123 | U | 7/2022 |
| CN | 115175069 | A | 10/2022 |
| CN | 115460496 | A | 12/2022 |
| CN | 115550783 | A | 12/2022 |
| CN | 218352706 | U | 1/2023 |
| EP | 4181531 | A1 | 5/2023 |

* cited by examiner

OPEN EARPHONES

CROSS-REFERENCES TO RELATED APPLICATIONS

This application is a continuation of International Patent Application No. PCT/CN2023/079400, filed on Mar. 2, 2023, which claims priority of Chinese Patent Application No. 202211336918.4, filed on Oct. 28, 2022, Chinese Patent Application No. 202223239628.6, filed on Dec. 1, 2022, and an International Patent Application No. PCT/CN2022/144339, filed on Dec. 30, 2022, the entire contents of each of which are hereby incorporated by reference.

TECHNICAL FIELD

The present disclosure relates to the field of open earphones, and in particular to open earphones.

BACKGROUND

With the development of acoustic output technology, acoustic devices (e.g., headphones) have been widely used in people's daily lives, and can be used in conjunction with electronic devices such as cell phones and computers to provide users with an auditory feast. Acoustic devices may generally be classified into head-mounted, ear-hook, and in-ear types according to the way users wear them. The output performance of the acoustic device, as well as the wearing comfort and stability will greatly affect the user's choice and experience.

Therefore, it is desirable to provide an open earphone, which can improve the wearing comfort of the user and the wearing stability of the open earphone while ensuring the output performance of the open earphone.

SUMMARY

One of the embodiments of the present disclosure provides an open earphone, comprising: a sound production component including a transducer and a housing accommodating the transducer; and an ear hook including a first portion of the ear hook and a second portion of the ear hook. The first portion of the ear hook may be hung between an auricle and a head of a user, and the second portion of the ear hook may extend towards a side of the auricle away from the head and connects with the sound production component to place the sound production component in a position near an ear canal but not blocking the ear canal; the housing and the first portion of the ear hook may clamp the auricle of the user, and provide a clamping force in a range of 0.03 N to 1 N to the auricle of the user.

BRIEF DESCRIPTION OF THE DRAWINGS

The present disclosure will be further illustrated by way of exemplary embodiments, which will be described in detail with the accompanying drawings. These embodiments are non-limiting. In these embodiments, the same count indicates the same structure, wherein.

DETAILED DESCRIPTION

Figure 1:
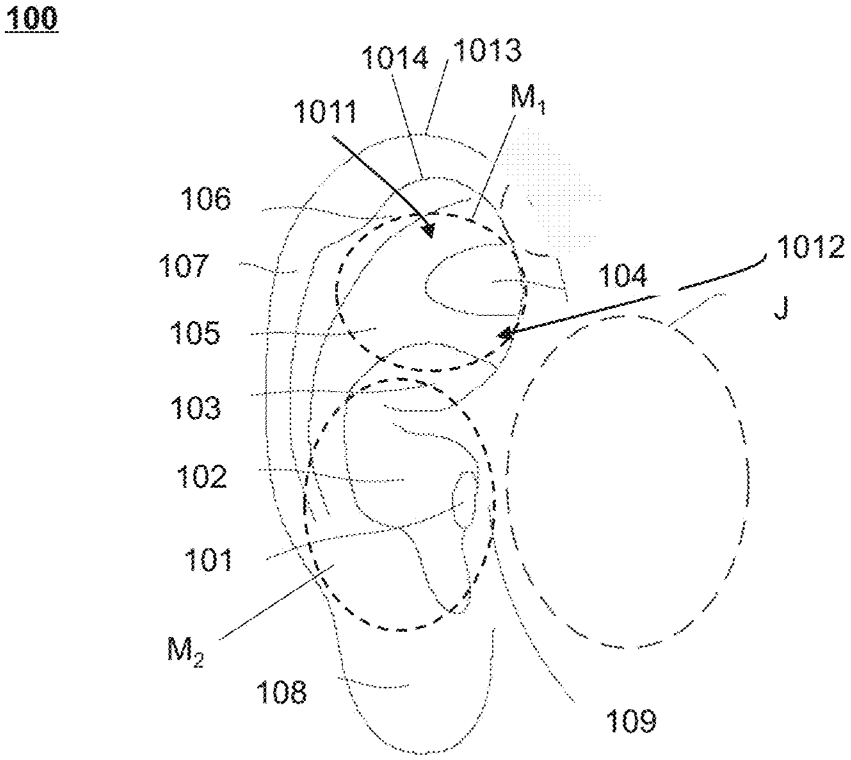
FIG. 1 is a schematic diagram illustrating an exemplary ear according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", "an" and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

FIG. 1 is a schematic diagram illustrating an exemplary ear according to some embodiments of the present disclosure.

As shown in FIG. 1, FIG. 1 is a schematic diagram illustrating an exemplary ear according to some embodiments of the present disclosure. Referring to FIG. 1, an ear 100 may include an external ear canal 101, an inferior concha 102, a concha boat 103, a triangular fossa 104, an antihelix 105, a scapha 106, a helix 107, an earlobe 108, a helix foot 109, an external contour 1013, and an internal contour 1014. It should be noted that, for ease of description, an upper antihelix crus 1011, a lower antihelix crus 1012, and the antihelix 105 are collectively referred to as an antihelix region in the embodiments of the present disclosure. In some embodiments, an acoustic device can be stably worn by support of one or more parts of the ear 100. In some embodiments, the external ear canal 101, the inferior concha 102, the concha boat 103, the triangular fossa 104, and other parts have a certain depth and volume in a three-dimensional space and may be used to achieve the wearing requirement of the acoustic device. For example, the acoustic device (e.g., an in-ear earphone) may be worn in the external auditory canal 101. In some embodiments, the acoustic device may be worn via other parts of the ear 100 excepting the external auditory canal 101. For example, the acoustic device may be worn via the concha boat 103, the triangular fossa 104, the antihelix 105, the scapha 106, the helix 107, or a combination thereof. In some embodiments, in order to improve the wearing comfort and reliability of the acoustic device, the acoustic device may be worn via the earlobe 108 of the user. The wearing of the acoustic device and the transmission of sound may be realized via other parts of the ear 100 excepting the external auditory canal 101, thereby "liberating" the external auditory canal 101 of the user. When the user wears the acoustic device (open earphone), the acoustic device may not block the external auditory canal 101 of the user, and the user may receive both a sound from the acoustic device and a sound from the environment (e.g., a sound of a whistle, a sound of a bicycle bell, a sound of people around, a sound of a traffic command, etc.), thereby reducing the probability of traffic accidents. In some embodiments, the acoustic device may be designed into a structure adapted to the ear 100 according to the structure of the ear 100, so that the sound production component of the acoustic device may be worn at different positions of the ear 100. For example, when the acoustic device is an open earphone, the open earphone may include a suspension structure (e.g., the ear hook) and a sound production component. The sound production component may be physically connected with the suspension structure, which may be adapted to a shape of an auricle to place the whole or part of the sound production component at the front side of the helix foot 109 (e.g., a region J enclosed by dotted lines in FIG. 1). As another example, the whole or part of the sound production component may be in contact with an upper portion of the external ear canal 101 (e.g., where one or more parts such as the helix foot 109, the concha boat 103, the triangular fossa 104, the antihelix 105, the scapha 106, the helix 107, etc., are located) when the user is wearing the open earphone. As another example, when the user wears the open earphone, the whole or part of the sound production component may be located within a cavity (e.g., an $M_1$ region enclosed by the dotted lines in FIG. 1 containing at least the concha boat 103, the triangular fossa 104 and an $M_2$ region containing at least the inferior concha 102) formed by one or more parts of the ear 100 (e.g., the inferior concha 102, the concha boat 103, the triangular fossa 104, etc.).

Different users may have individual differences, resulting in different shapes, dimensions, etc., of ears. For ease of description and understanding, if not otherwise specified, the present disclosure primarily uses a "standard" shape and dimension ear model as a reference and further describes the wearing manners of the acoustic device in different embodiments on the ear model. For example, a simulator (e.g., GRAS 45BC KEMAR) containing the head and (left and right) ears produced based on standards of ANSI: S3.36, S3.25 and IEC: 60318-7, may be used as a reference for wearing the acoustic device to present a scenario in which most users wear the acoustic device normally. Merely by way of example, the reference ear 100 may have the following relevant features: a size in a vertical axis direction of a projection of an auricle on a sagittal plane may be in a range of 49.5 mm-74.3 mm, and a size in a sagittal axis direction of a projection of the auricle on the sagittal plane may be in a range of 36.6 mm-55 mm. Thus, in the present disclosure, the descriptions such as "worn by the user," "in a wearing state," and "in the wearing state" refer to the acoustic device described in the present disclosure being worn on the ear of the aforementioned simulator. Of course, considering the individual differences of different users, structures, shapes, dimensions, thicknesses, etc., of one or more parts of the ear 100 may be different. These differential designs may be manifested as feature parameters of one or more parts of the acoustic device (e.g., a sound production component, an ear hook, etc., in the following descriptions) having different ranges of values, thus adapting to different ears 100. In addition, it should be noted that the "non-wearing state" is not limited to the state that the open earphone is not worn in the ear 100 of the user, but also includes the state that the open earphone deforms but not subjected an external force; and the "wearing state" is not limited to the state that the open earphone is worn in the ear 100 of the user, and the state that the suspension structure (e.g., the ear hook) and the sound production component are arranged in a certain distance.

It should be noted that in the field of medicine, anatomy, etc., three basic sections including a sagittal plane, a coronal plane, and a horizontal plane of the human body may be defined, respectively, and three basic axes including a sagittal axis, a coronal axis, and a vertical axis may also be defined. As used herein, the sagittal plane refers to a section perpendicular to the ground along a front and rear direction of the body, which divides the human body into left and right parts. The coronal plane refers to a section perpendicular to the ground along a left and right direction of the body, which divides the human body into front and rear parts. The horizontal plane refers to a section parallel to the ground along an up and down direction of the body, which divides the human body into upper and lower parts. Correspondingly, the sagittal axis refers to an axis along the front and rear direction of the body and perpendicular to the coronal plane. The coronal axis refers to an axis along the left and right direction of the body and perpendicular to the sagittal plane. The vertical axis refers to an axis along the up and down direction of the body and perpendicular to the horizontal plane. Further, the "front side of the ear" as described in the present disclosure is a concept relative to the "rear side of the ear," where the former refers to a side of the ear toward the facial region of the human body along the sagittal axis direction, and the latter refers to a side of the ear away from the facial region of the human body along the sagittal axis direction. In this case, observing the ear of the above simulator in a direction along the coronal axis of the human body, a schematic diagram illustrating the front side of the ear as shown in FIG. 1 is obtained.

The above description of the ear 100 is for illustration purposes only and is not intended to limit the scope of the present disclosure. For those skilled in the art, various modifications or changes may be made according to the description of the present disclosure. For example, a portion of the acoustic device may cover a part or whole of the external auditory canal 101. These changes and modifications are still within the protection scope of the present disclosure.

Figure 2:
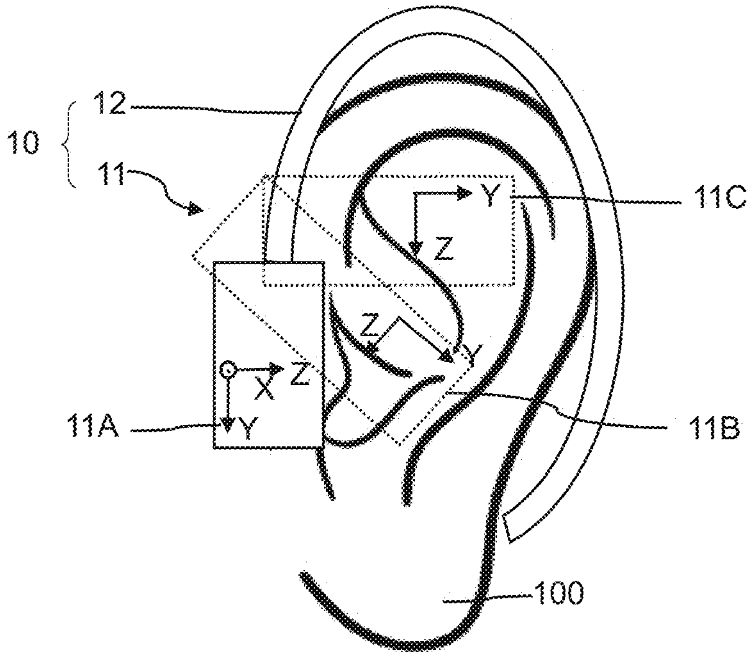
FIG. 2 is a structural diagram illustrating an exemplary open earphone according to some embodiments of the present disclosure.

FIG. 2 is a structure diagram illustrating an exemplary open earphone according to some embodiments of the present disclosure. As shown in FIG. 2, an open earphone 10 may include a sound production component 11 and a suspension structure 12. In some embodiments, the sound production component 11 of the open earphone 10 may be worn on the user's body (e.g., the head, the neck or the upper trunk of the human body) through the suspension structure 12. In some embodiments, the suspension structure 12 may be an ear hook 12. The sound production component 11 may be connected with one end of the ear hook 12. The ear hook 12 may be a shape adapted to the ear 100 of the user. For example, the ear hook 12 may be an arc-shaped structure. In some embodiments, the suspension structure 12 may be a clamping structure adapted to the auricle of the user, so that the suspension structure 12 may be clamped at the auricle of the user. In some embodiments, the ear hook 12 may include a first portion and a second portion. The first portion of the ear hook may be hung between the auricle and the head of the user, and the second portion of the ear hook may extend towards a side of the auricle away from the head and connect with the sound production component 11 to place the sound production component 11 in a position near an ear canal but not blocking the ear canal. In some embodiments, the ear hook 12 may be composed of a metal wire and a wrapping layer, so that the open earphone 10 may be better fixed on the user's body, while ensuring comfort, and preventing falling during use.

In some embodiments, the sound production component 11 may include a transducer and a housing accommodating the transducer. The transducer may generate sound by converting an electrical signal into a corresponding mechanical vibration. In some embodiments, the open earphone 10 may be combined with products such as glasses, a headset, a head-mounted display device, an AR/VR helmet, etc. In this case, the sound production component 11 may be fixed near the ear 100 of the user in a suspension or clamping manner. In some embodiments, the housing may have a shape adapted to the human ear 100, e.g., circular, elliptical, polygonal (regular or irregular), U-shaped, V-shaped, and semicircular, so that the sound production component 11 may be directly hung on the ear 100 of the user.

Figure 5:
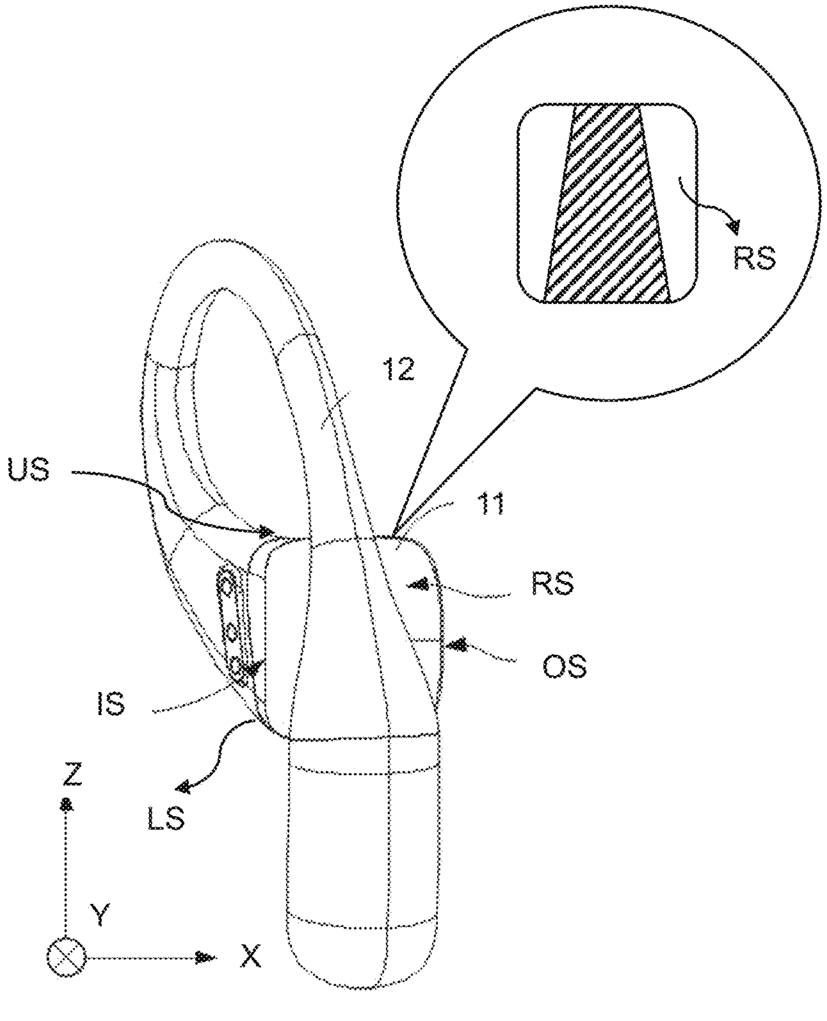
FIG. 5 is a structural diagram illustrating another exemplary structure of the open earphone shown in FIG. 3.

Referring to FIG. 1 and FIG. 2, in some embodiments, when the user wears the open earphone 10, the sound production component 11 may be at least partially located above, below, on the front side of the user's ear 100 (e.g., a J region at a front side of the tragus shown in FIG. 1), or inside the auricle (e.g., an M region shown in FIG. 1). Different wearing positions of the sound production component 11 (11A, 11B, and 11C) may be exemplarily described. In some embodiments, a sound production component 11A is located on the side of the user's ear 100 toward a facial region of the human body along a sagittal axis direction, i.e., the sound production component 11A is located on a position (e.g., a J region shown in FIG. 1) of the ear 100 toward the facial region of the human body. Further, a loudspeaker may be provided inside the housing of the sound production component 11A, and at least one sound outlet (not shown in FIG. 2) may be provided on the housing of the sound production component 11A. The sound outlet may be located on a side wall of the housing toward or close to the external auditory canal 101 of the user. The loudspeaker may output a sound to the ear canal of the user through the sound outlet. In some embodiments, the loudspeaker may include a diaphragm. A cavity inside the housing may be at least divided into a front cavity and a rear cavity. The sound outlet may be acoustically coupled with the front cavity. The diaphragm may drive the air in the front cavity to vibrate to generate an air-conducted sound. The air-conducted sound generated in the front cavity may be transmitted to the outside through the sound outlet. In some embodiments, the housing may further include one or more pressure relief holes located on a side wall of the housing adjacent to or opposite to a side wall where the sound outlet is located. The pressure relief holes may be acoustically coupled with the rear cavity. The vibration of the diaphragm may also drive the air in the rear cavity to vibrate to produce an air-conducted sound. The air-conducted sound generated in the rear cavity may be transmitted to the outside through the pressure relief holes. Exemplarily, in some embodiments, the loudspeaker in the sound production component 11A may output sounds with a phase difference (e.g., opposite phases) through the sound outlet and the pressure relief holes. The sound outlet may be located on the side wall of the housing of the sound production component 11A facing the external auditory canal 101 of the user. The pressure relief holes may be located on a side of the housing of the sound production component 11 away from the external auditory canal 101 of the user. In this case the housing may act as a baffle, increasing a path difference between a sound path from the sound outlet to the external auditory canal 101 and a sound path from the pressure relief holes to the external auditory canal 101, thereby increasing a sound intensity at the external auditory canal 101 while reducing a volume of far-field sound leakage. In some embodiments, the sound production component 11 may have a long-axis direction Y and a short-axis direction Z perpendicular to a thickness direction X and orthogonal to each other. The long-axis direction X may be defined as a direction having the largest extension dimension in a shape of a two-dimensional projection plane (e.g., a projection of the sound production component 11 in a plane where the outer side surface OS of the sound production component 11 is located, or a projection on a sagittal plane) of the sound production component 11 (e.g., when the projection shape is rectangular or approximately rectangular, the long-axis direction may be a length direction of the rectangle or approximately rectangle.). The short-axis direction Y may be defined as a direction perpendicular to the long-axis direction X in the shape of the projection of the sound production component 11 on the sagittal plane (e.g., when the projection shape is rectangular or approximately rectangular, the short-axis direction may be a width direction of the rectangle or approximately rectangle.). The thickness direction X may be defined as a direction perpendicular to the two-dimensional projection plane, for example, in the same direction as a coronal axis, both pointing to the left and right side of the body. As shown in FIG. 5, the thickness direction X may also be defined as a direction in which the housing is toward or away from the ear 100 in the wearing state. In some embodiments, when the sound production component 11 is in an inclined state in the wearing state, the long-axis direction Y and the short-axis direction Z may be still parallel or approximately parallel to the sagittal plane, and the long-axis direction Y may have an angle with the sagittal axis direction, i.e., the long-axis direction Y may also be inclined accordingly, and the short-axis direction Z may have a certain angle with the vertical axis direction, i.e., the short-axis direction Z may also be inclined accordingly, as the wearing state of the sound production component 11B shown in FIG. 2. In some embodiments, the whole or part of the housing of the sound production component 11B may extend into the inferior concha 102, i.e., a projection of the housing of the sound production component 11B on a sagittal plane and a projection of the inferior concha 102 on the sagittal plane may have an overlapping part. The specific descriptions regarding the sound production component 11B may be found elsewhere in the present disclosure (e.g., FIG. 3 and descriptions thereof). In some embodiments, in the wearing state, the sound production component 11 may be in a horizontal or approximately horizontal state, as shown in a sound production component 11C in FIG. 2, the long-axis direction Y may be consistent or approximately consistent with the sagittal axis direction, both pointing to the front and back direction of the body, and the short-axis direction Z may be consistent or approximately consistent with the vertical axis direction, both pointing to the up and down direction of the body. It should be noted that in the wearing state, the sound production component 11C being in the approximately horizontal state means that an angle between the long-axis direction of the sound production component 11C shown in FIG. 2 and the sagittal axis may be in a specific range (e.g., not greater than 20°). The specific descriptions regarding the sound production component 11C may be found elsewhere in the present disclosure (e.g., FIG. 8 and corresponding descriptions thereof). In addition, the sound production component 11 in different wearing positions may not be limited to the sound production component 11A, the sound production component 11B, and the sound production component 11C shown in FIG. 2, as long as the wearing position of the sound production component 11 meets the J region, the $M_1$ region, or the $M_2$ region shown in FIG. 1. For example, the whole or part of the sound production component 11 may be located on the front side of the helix foot 109 (e.g., the J region enclosed by the dotted lines in FIG. 1). As another example, the whole or part of the sound production component 11 may be in contact with an upper portion of the external ear canal 101 (e.g., where one or more parts such as the helix foot 109, the concha boat 103, the triangular fossa 104, the antihelix 105, the scapha 106, the helix 107, etc., are located). As another example, the whole or part of the sound production component 11 may be located within a cavity formed by one or more parts of the ear 100 (e.g., the inferior concha 102, the concha boat 103, the triangular fossa 104, etc.) (e.g., the region $M_1$ enclosed by the dotted lines in FIG. 1 containing at least the concha boat 103, the triangular fossa 104 and the $M_2$ region containing at least the inferior concha 102).

In order to improve the stability of the open earphone 10 in the wearing state, the open earphone 10 may adopt any one of the following ways, or a combination thereof. The first one, the ear hook 12 may be at least partially configured as a profiling structure that fits at least one of the rear side of the ear and the head, so as to increase the contact area between the ear hook 12 and the ear 100 and/or the head, thereby increasing a resistance of the open earphone 10 falling off the ear 100. The second one, the ear hook 12 may be at least partially configured as an elastic structure, so that the ear hook 12 may have a certain amount of deformation in the wearing state, thereby increasing the positive pressure of the ear hook 12 on the ear 100 and/or the head, and increasing the resistance of the open earphone 10 falling off the ear 100. The third one, the ear hook 12 may be at least partially configured to abut against the head in the wearing state, so as to form a reaction force that presses the ear 100, thereby making the sound production component 11 be pressed on the front side of the ear, and increasing the resistance of the earphone 10 falling off the ear 100. The fourth one, the sound production component 11 and the ear hook 12 may be configured to clamp the antihelix region and a region where the inferior concha 102 is located, etc., from the front and rear sides of the ear 100 in the wearing state, thereby reducing the resistance of the open earphone 10 falling off the ear 100. The fifth one, the sound production component 11 or an auxiliary structure connected with the sound production component 11 may be configured to at least partially extend into cavities such as the inferior concha 102, the concha boat 103, the triangular fossa 104, and the scapha 106, thereby increasing the resistance of the open earphone 10 falling off the ear 100.

Figure 3:
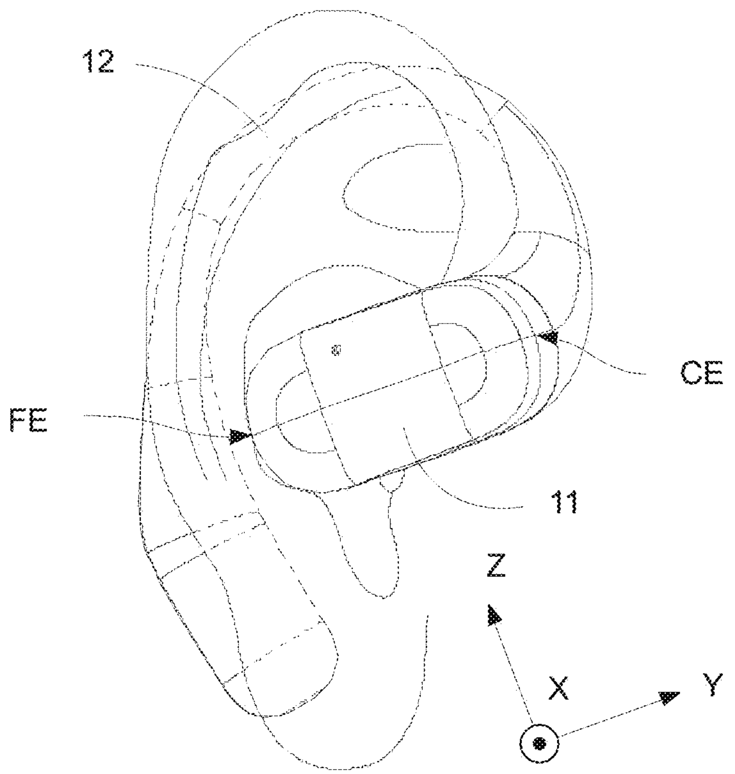
FIG. 3 is a schematic diagram illustrating an exemplary wearing of an open earphone according to some embodiments of the present disclosure.

Merely by way of example, referring to FIG. 3, in the wearing state, a free end FE of the sound production component 11 may extend into the inferior concha 102. The sound production component 11 and the ear hook 12 may be configured to clamp the aforementioned ear region from the front and rear sides of the ear region corresponding to the inferior concha 102, thereby increasing the resistance of the open earphone 10 falling off the ear 100, and then improving the stability of the open earphone 10 in the wearing state. For example, the free end FE may be pressed and held in the inferior concha in the thickness direction X. As another example, the free end FE may be pressed against the inferior concha in the long-axis direction X and in the short-axis direction Z.

The open earphone 10 will be described in detail by taking the open earphone 10 shown in FIG. 3 as an example. It should be known that, the structure of the open earphone 10 in FIG. 3 and corresponding parameters thereof, without violating the corresponding acoustic principle, may also be applicable to the open earphones of other configurations mentioned above.

Figure 4:
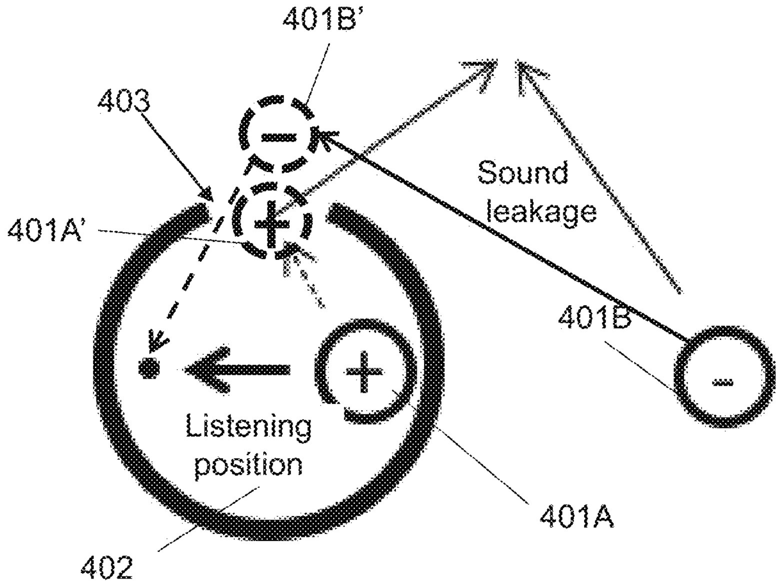
FIG. 4 is a schematic diagram illustrating an exemplary distribution of cavity structures around one sound source of double sound sources according to some embodiments of the present disclosure.

The sound production component may at least partially extend into the inferior concha 102, which may result in an increase in a listening volume at a listening position (e.g., an opening of the ear canal), especially the listening volume of the low and middle frequencies, while still retaining a good cancellation effect of far-field sound leakage. Merely by way of example, when the whole or part of the sound production component 11 extends into the inferior concha 102, the sound production component 11 and the inferior concha 102 may form a structure similar to a cavity (hereinafter referred to as a quasi-cavity). In the embodiments of the present disclosure, the quasi-cavity may be understood as a semi-closed structure enclosed by a side wall of the sound production component 11 and the inferior concha 102. This semi-closed structure may make internal and external environments not completely sealed and isolated but have a leakage structure acoustically communicated with the external environment (e.g., an opening, a gap, a pipe, etc.). When the user wears the open earphone 10, one or more sound outlets may be provided on a side wall of the housing of the sound production component 11 near or toward the ear canal of the user, and one or more pressure relief holes may be provided on another side wall of the housing of the sound production component 11 (e.g., a side wall away from or back to the ear canal of the user. The sound outlets may be acoustically coupled with the front cavity of the open earphone 10, and the pressure relief holes may be acoustically coupled with the rear cavity of the open earphone 10. Taking the sound production component 11 including a sound outlet and a pressure relief hole as an example, sound output by the sound outlet and sound output by the pressure relief hole may be approximately regarded as two sound sources, sound waves of the two sound sources may be in opposite phases, and inner walls corresponding to the sound production component 11 and the inferior concha 102 may form a quasi-cavity structure, the sound source corresponding to the sound outlet may be located in the quasi-cavity structure, and the sound source corresponding to the pressure relief hole may be located outside the quasi-cavity structure, forming an acoustic model shown in FIG. 4. As shown in FIG. 4, the quasi-cavity structure 402 may include a listening position and at least one sound source 401A. "Include" here means that at least one of the listening position or the sound source 401A is located inside the quasi-cavity structure 402, and also means that at least one of the listening position or the sound source 401A is located at an inner edge of the quasi-cavity structure 402. The listening position may be equivalent to the opening of the ear canal, or an acoustic reference point of the ear, such as an ear reference point (ERP), an ear-drum reference point (DRP), etc., or an entrance structure guiding to a listener, or the like. Since the sound source 401A is surrounded by the quasi-cavity structure 402, most of the sound radiated from the sound source 401A may reach the listening position through direct transmission or reflection. In contrast, without the quasi-cavity structure 402, most of the sound radiated from the sound source 401A may not reach the listening position. Therefore, the cavity structure may make it possible to significantly increase the volume of sound reaching the listening position. At the same time, only a small portion of an inversion sound radiated from an inversion source 401B outside the quasi-cavity structure may enter the quasi-cavity structure 402 through a leaking structure 403 of the quasi-cavity structure. This is equivalent to the creation of a secondary sound source 401B' at the leaking structure 403, whose intensity is significantly smaller than the intensity of the sound source 401B and also significantly smaller than the intensity of the sound source 401A. The sound generated by the secondary sound source 401B' may have a weak inversion cancellation effect on the sound source 401A in the cavity, so that the listening volume at the listening position may be significantly increased. For the sound leakage, the sound source 401A radiating a sound to the outside through the leaking structure 403 of the cavity may be equivalent to generating a secondary sound source 401A' at the leaking structure 403. Since almost all the sound radiated from the sound source 401A is output from the leaking structure 403, and a structural scale of the quasi-cavity structure is much smaller than a spatial scale for evaluating the sound leakage (the difference is at least one order of magnitude), the intensity of the secondary sound source 401A' may be considered as comparable to the intensity of the sound source 401A. For the external space, the secondary sound source 401A' and the sound source 401B may form double sound source cancellation to reduce sound leakage.

In a specific application scenario, the surface of an outer wall of the housing of the sound production component 11 is usually a plane or a curved surface, while a contour of the user's inferior concha 102 is an uneven structure. By extending the part or whole structure of the sound production component 11 into the inferior concha 102, the quasi-cavity structure communicating with the outside may be formed between the sound production component 11 and the contour of the inferior concha 102. Further, the sound outlets may be arranged at a position of the housing of the sound production component 11 toward the ear canal opening of the user and near the edge of the inferior concha 102, and the pressure relief holes may be arranged at a position of the sound production component 11 back to or away from the ear canal opening, so that the acoustic model shown in FIG. 4 may be constructed, thereby improving the listening position of the user at the ear canal opening when the user wears the open earphone, and reducing the far-field sound leakage effect.

FIG. 5 is a structural diagram illustrating another exemplary structure of the open earphone shown in FIG. 3. Referring to FIG. 3 and FIG. 4, in some embodiments, the sound production component 11 may include a transducer and a housing accommodating the transducer. The housing may include an inner side surface IS toward the ear 100 and an outer side surface OS back to the ear 100 along the thickness direction X in the wearing state. The housing may also include a connection surface connecting the inner side surface IS and the outer side surface OS. It should be noted that in the wearing state, when viewed along a direction of the coronal axis (i.e., the thickness direction X), the sound production component 11 may be provided in a shape of a circle, an oval, a rounded square, a rounded rectangle, etc. When the sound production component 11 is provided in the shape of a circle, an ellipse, etc., the above-mentioned connection surface refers to an arc-shaped side surface of the sound production component 11; and when the sound production component 11 is provided in the shape of a rounded square, a rounded rectangle, etc., the above-mentioned connection surface may include a lower side surface LS, an upper side surface US, and a rear side surface RS as mentioned later. Therefore, for ease of description, this embodiment is exemplarily illustrated with the sound production component 11 set in a rounded rectangle. The length of the sound production component 11 in the long-axis direction Y may be greater than the width of the sound production component 11 in the short-axis direction Z. As shown in FIG. 5, the sound production component 11 may have the upper side surface US back to the external auditory canal 101 and the lower side surface LS toward the external auditory canal 101 along the short-axis direction Z in the wearing state, and also have the rear side surface RS connecting the upper side surface US and the lower side surface LS. The rear side surface RS may be located at an end of the long-axis direction Y toward the back of the head in the wearing state, and at least partially located in the inferior concha 102.

Further, the housing may at least partially extend into the user's inferior concha 102. A portion of the housing at least partially extending into the user's inferior concha 102 may include at least one clamping region in contact with the side wall of the user's inferior concha 102. The clamping region may be arranged at the free end FE of the sound production component 11. In some embodiments, the orthographic projection of the ear hook 12 on a reference plane (e.g., an XZ plane in FIG. 5) perpendicular to the long-axis direction Y may partially overlap with the orthographic projection of the free end FE on the same reference plane (as shown in a shaded portion on the rear side surface RS in the figure), thereby forming a projection overlapped region. The clamping region may be defined as a region on the rear side surface RS that forms the projection overlapped region on the reference plane. The projection overlapped region formed by the orthographic projection of the ear hook 12 on the aforementioned reference plane and the orthographic projection of the free end FE on the same reference plane may be located between the inner side surface IS and the outer side surface OS in the thickness direction X. In this way, not only the sound production component 11 and the ear hook 12 may jointly clamp the ear 100 from the front and rear sides of the ear 100, but also the formed clamping force may be mainly expressed as a compressive stress, thereby improving the stability and comfort of the acoustic device 10 in the wearing state. It can be understood that when the sound production component 11 is provided in the shape of a circle, an ellipse, etc., the clamping region may be defined as a region on a connection surface (a curved side of the sound production component 11) corresponding to the projection overlapped region. The clamping region may be a region of the sound production component 11 configured to clamp the inferior concha 102. However, different users may have individual differences, resulting in different shapes, dimensions, etc., of ears. In the actual wearing state, the clamping region may not necessarily clamp the inferior concha 102, but for most users and the aforementioned standard ear model 100, the clamping region clamps the user's inferior concha 102 in the wearing state.

In some embodiments, the clamping region and/or an inner side of the clamping region may be provided with a flexible material. The specific descriptions regarding the flexible material may be found elsewhere in the present disclosure (e.g., FIG. 7 and corresponding descriptions thereof).

Figure 6:
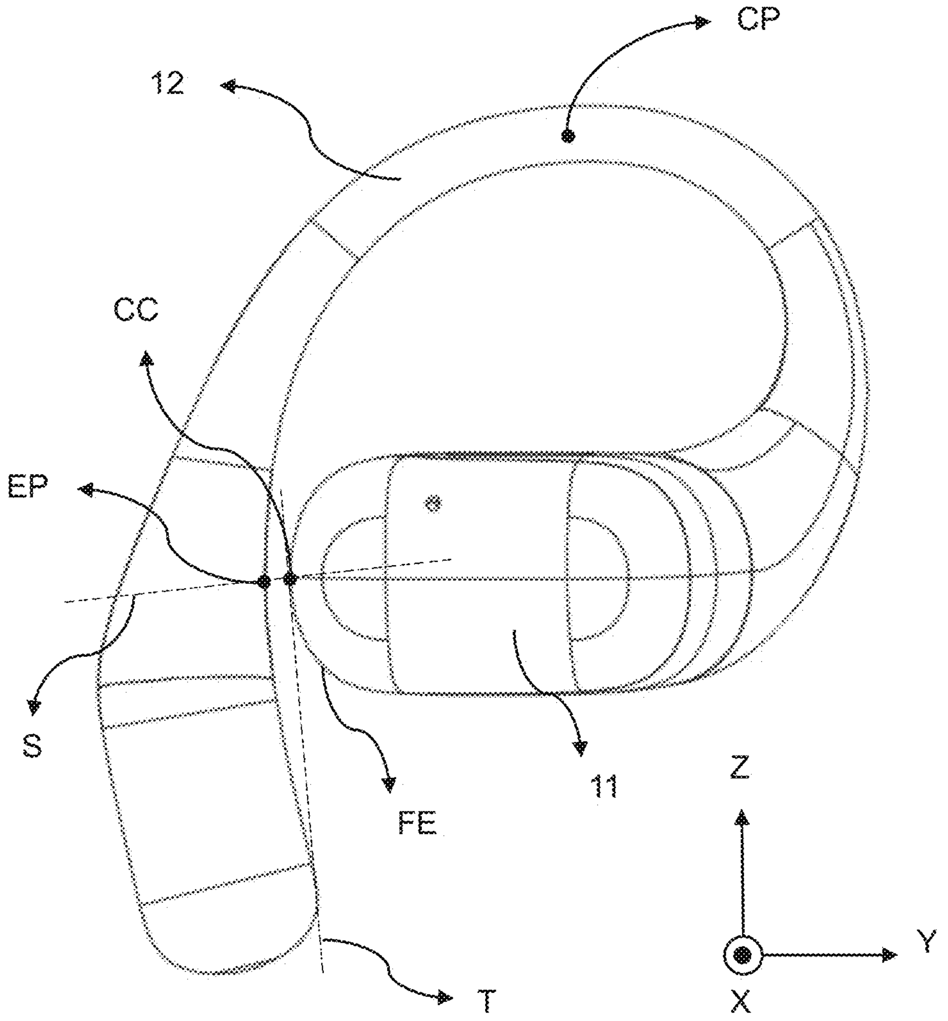
FIG. 6 is a structural diagram illustrating another exemplary structure of the open earphone shown in FIG. 3.

In some embodiments, as shown in FIG. 3, the sound production component 11 and the ear hook 12 may jointly clamp the ear 100 from the front and rear sides of the ear 100 (e.g., the inferior concha 102), and the formed clamping force may be mainly manifested as a compressive stress, thereby improving the stability and comfort of the open earphone 10 in the wearing state. As shown in FIG. 6, the sound production component 11 may include a clamping region center CC, and the ear hook 12 may include a clamping fulcrum CP and an ear hook clamping point EP.

The clamping fulcrum CP mentioned here may be understood as a fulcrum of the ear hook 12 that contacts the auricle and provides support for the open earphone when the open earphone is worn. Considering that there is a continuous region on the ear hook 12 that is in contact with a side of the auricle toward the head and provides support, for ease of understanding, in some embodiments, an extreme point of the ear hook 12 located in this region may be regarded as the clamping fulcrum CP. The extreme point of the ear hook 12 may be determined as follows: an inner contour of a projection curve of the open earphone on the sagittal plane of the user in the wearing state (or an inner contour of a projection of the open earphone on an ear hook plane in a non-wearing state) may be obtained, and an extreme point (e.g., a maximum point) of the inner contour of the projection curve in the short-axis direction Z may be used as an extreme point of the ear hook 12, which is located near the highest point in the vertical axis direction of the human body in the wearing state (e.g., a position within 15 mm of a rear side of the highest point). It should be noted that the ear hook structure may be an arc structure, and the ear hook plane may be a plane formed by three most protruding points on the ear hook 12, i.e., the plane that supports the ear hook 12 when the ear hook 12 is placed freely. In other embodiments, the ear hook plane also refers to a plane formed by a bisector line that bisects or roughly bisects the ear hook 12 along the long-axis direction Y of the ear hook 12. The extreme point of the inner contour of the projection curve in the width direction Z may be determined as follows: a coordinate system may be constructed by taking the long-axis direction Y of the sound production component 11 as a horizontal axis and the short-axis direction Z as a vertical axis, and the maximum point of the inner contour of the projection curve on the coordinate system (e.g., a first-order derivative is 0) may be taken as the extreme point of the inner contour of the projection curve in the width direction Z. In addition, when the non-wearing state changes to the wearing state, the sound production component 11 and an end of the ear hook 12 away from the sound production component 11 (e.g., a battery compartment) may be stretched. In this case, the clamping fulcrum CP may produce a larger strain. Therefore, in some alternative embodiments, a center of a cross section corresponding to a position of maximum strain on the ear hook 12 before and after wearing may be taken as the clamping fulcrum CP. Alternatively, in order to easily generate a large strain at the clamping fulcrum CP, the ear hook 12 may be set as a variable cross-section structure, i.e., cross-sectional areas of different positions of the ear hook 12 may be different, and a center of a cross section of the ear hook 12 with the smallest cross-sectional area may be taken as the clamping fulcrum CP. In other alternative embodiments, when the user wears the open earphone, a main action position of a support force of the user's ear 100 on the ear hook 12 may be a highest point of the ear hook 12 in the vertical axis direction of the human body, which may be regarded as the clamping fulcrum CP.

The clamping region center CC refers to a point capable of representing the clamping region and configured to describe the position of the clamping region relative to other structures. In some embodiments, the clamping region center CC may be configured to represent a position where the clamping region exerts the greatest force on the ear 100 in a standard wearing condition. The standard wearing condition may be a condition in which the open earphone is correctly worn on the aforementioned standard ear model according to a wearing specification. In some embodiments, when the sound production component 11 is provided in the shape of a circle, an oval, a rounded square, a rounded rectangle, etc., an intersection point between the long axis of the sound production component and the clamping region may be defined as the clamping region center CC. It should be noted that the long axis of the sound production component may be a central axis of the sound production component 11 along the aforementioned long-axis direction Y. The clamping region center CC may be determined as follows: an intersection point between an orthographic projection of the sound production component 11 on a reference plane (e.g., an XZ plane in FIG. 6) perpendicular to the long-axis direction Y and an orthographic projection of the central axis on the same reference plane may be determined, and the clamping region center CC may be defined as a point on the sound production component 11 that forms the intersection point on the reference plane. In other embodiments, when the long axis of the sound production component 11 is difficult to determine (e.g., the sound production component 11 is provided in an irregular shape), as shown in FIG. 6, the clamping region center CC may be defined as an intersection point between a tangent plane of the free end FE and the end of the ear hook 12 away from the sound production component 11 (e.g., the battery compartment) and the free end FE. The clamping region center CC may be determined as follows: a tangent line T of an orthographic projection of the sound production component 11 on a reference plane (e.g., a YZ plane in FIG. 6) and an orthographic projection of the end of the ear hook 12 (e.g., the battery compartment) on the same reference plane may be determined, an intersection point between the tangent line T on the reference plane and the orthographic projection of the free end FE may be determined, and the clamping region center CC may be defined as a point of the free end FE that forms the intersection point on the reference plane.

In some embodiments, after a shape and a dimension of the sound production component 11 are determined, a covering position of the sound production component 11 in the inferior concha 102 in the wearing state and a clamping position of the sound production component 11 clamping the inferior concha 102 (or even the tragus near the inferior concha 102) may also be changed by designing a distance between the clamping region center CC and the clamping fulcrum CP, thereby affecting the stability and comfort of the user wearing the open earphone, and affecting the listening effect of the open earphone. That is to say, in the wearing state, the distance between the clamping region center CC and the clamping fulcrum CP may keep in a certain range. When the shape and the dimension of the sound production component 11 are constant, if the aforementioned distance is too large, the position of the sound production component 11 in the inferior concha 102 may be lower, and a gap between the upper side surface US of the sound production component 11 and the inferior concha 102 may be too large, i.e., an opening of the formed quasi-cavity may be too large, the contained sound source (i.e., the sound outlet on the inner side surface IS) may directly radiate more sound components to the environment, and the sound reaching the listening position may be relatively small. Meanwhile, the sound from the external sound source entering the quasi-cavity may increase, resulting in near-field sound cancellation, which in turn leads to a smaller listening index. Moreover, if the aforementioned distance is too large, there may be too much interference between the sound production component 11 (or a connection region between the ear hook 12 and the sound production component) and the tragus, causing the sound production component 11 to squeeze the tragus too much, and affecting the wearing comfort. When the shape and the dimension of the sound production component 11 are constant, if the aforementioned distance is too small, the upper side surface US of the sound production component 11 may be attached to the upper edge of the inferior concha 102, and the gap between the upper side surface US and the inferior concha 102 may be too small (or a count of gaps may be two small), even making the internal environment completely sealed and isolated from the external environment, and failing to form the quasi-cavity structure. Moreover, if the aforementioned distance is too small, the sound production component 11 (or the connection region between the ear hook 12 and the sound production component) may squeeze the outer contour of the ear too much, which may also affect the wearing comfort. The listening index takes a reciprocal 1/$\alpha$ of a sound leakage index $\alpha$ as an evaluation effect of each configuration. The listening index means the size of the listening volume when the sound leakage is the same. From an application, the listening index should be as large as possible. If the gap is too small (e.g., the opening of the quasi-cavity is too small), the sound leakage reduction effect may be poor. If too few gaps are formed, a count of the opening of the quasi-cavity may be small. Compared with the cavity structure with fewer openings, the cavity structure with more openings may better improve a resonant frequency of the air-conducted sound in the cavity structure, so that the whole device may have a better listening index in a high-frequency range (e.g., sound with a frequency close to 10000 Hz) than the cavity structure with fewer openings. Moreover, the high-frequency range is a frequency range that the human ear is more sensitive to, so the demand for leakage reduction is greater. Therefore, if too few gaps are formed, the sound leakage reduction effect in the high-frequency range cannot be improved. In some embodiments, in order to make the open earphone have a better hearing index in the wearing state, a distance between the clamping region center CC and the clamping fulcrum CP may be in a range of 20 mm to 40 mm. In some embodiments, in order to further improve the sound leakage reduction effect, the distance between the clamping region center CC and the clamping fulcrum CP may be in a range of 23 mm to 35 mm. In some embodiments, in order to make the quasi-cavity structure formed by the sound production component 11 and the inferior concha 102 have a more suitable volume and opening size/count, the distance between the clamping region center CC and the clamping fulcrum CP may be in a range of 25 mm to 32 mm.

The ear hook clamping point EP may be a point of the ear hook 12 closest to the clamping region center CC, and may be configured to measure the clamping condition of the ear hook 12 to the ear 100 in the wearing state. The clamping force of the ear hook 12 to the ear 100 may be changed by setting the position of the ear hook clamping point EP. In some embodiments, when the sound production component 11 is provided in the regular shape of a circle, an oval, a rounded square, a rounded rectangle, etc., the intersection point between the long axis of the sound production component and the first portion of the ear hook may be defined as the ear hook clamping point EP. The ear hook clamping point EP may be determined as follows: a point of the first portion of the ear hook corresponding to an intersection point between an orthographic projection of the first portion of the ear hook on the reference plane (e.g., the XZ plane in FIG. 6) perpendicular to the long-axis direction Y and the orthographic projection of the central axis of the sound production component 11 on the same reference plane may be defined as the ear hook clamping point EP. In some embodiments, when the long axis of the sound production component 11 is difficult to determine (e.g., the sound production component 11 is provided in an irregular shape), as shown in FIG. 6, the ear hook clamping point EP may be defined as an intersection point between a tangent plane passing through the clamping region center CC and perpendicular to the tangent plane of the free end FE and the end of the ear hook 12 away from the sound production component 11 (e.g., the battery compartment) and a portion of the ear hook 12 close to the free end FE. The ear hook clamping point EP may be determined as follows: a straight line S passing through the orthographic projection of the clamping region center CC on the reference plane of the clamping region center CC on the reference plane (e.g., the YZ plane in FIG. 6) perpendicular to the thickness direction X and perpendicular to the tangent line T may be determined, an intersection point of the straight line S and a portion of the orthographic projection of the ear hook 12 on the reference plane close to the orthographic projection of the free end FE on the reference plane may be also determined, and the ear hook clamping point EP may be defined as a point of the ear hook 12 that forms the intersection point on the reference plane.

In some embodiments, in the wearing state, a distance between the ear hook clamping point EP of the first portion of the ear hook and the clamping fulcrum CP may keep in a certain range. If the aforementioned distance is too large, the ear hook 12 between the ear hook clamping point EP and the clamping fulcrum CP may be too straight or difficult to be clamped on the rear side of the inferior concha 102 (e.g., the clamping position may be lower relative to the inferior concha 102), and the end of the ear hook 12 away from the sound production component 11 (e.g., the battery compartment) may not fit well with the ear 100. If the aforementioned distance is too small, the ear hook 12 between the ear hook clamping point EP and the clamping fulcrum CP may be bent or difficult to be clamped on the back side of the inferior concha 102 (e.g., a holding position may be upper relative to the inferior concha 102), and the end of the ear hook 12 away from the sound production component 11 may squeeze the ear 100, resulting in poor comfort. In some embodiments, in order to meet the wearing requirements, in the wearing state, the distance between the ear hook clamping point EP of the first portion of the ear hook and the clamping fulcrum CP may be in a range of 25 mm to 45 mm. In some embodiments, in order to make the end of the ear hook 12 away from the sound production component 11 better fit with the ear 100, in the wearing state, the distance between the ear hook clamping point EP of the first portion of the ear hook and the clamping fulcrum CP may be in a range of 26 mm to 40 mm. In some embodiments, in order to improve comfort, in the wearing state, the distance between the ear hook clamping point EP of the first portion of the ear hook and the clamping fulcrum CP may be in a range of 27 mm to 36 mm.

In some embodiments, as shown in FIG. 3, in the wearing state, viewed along the direction of the coronal axis of the human body, a connection end CE may be closer to the top of the head than the free end FE, so that the free end FE may extend into the inferior concha 102. Accordingly, an angle between the long-axis direction Y and the sagittal axis direction of the human body may keep in a certain range. When the shape and the dimension of the sound production component 11 are constant, if the aforementioned angle is too small, the upper side surface US of the sound production component 11 may be attached to the upper edge of the inferior concha 102, and the gap between the upper side surface US and the inferior concha 102 may be too large (or the count of the gaps may be too small), resulting in a poor sound leakage reduction effect, and a long distance between the sound outlet of the sound production component 11 and the external auditory canal 101. When the shape and the dimension of the sound production component 11 are constant, if the aforementioned angle is too large, the gap between the upper side surface US of the sound production component 11 and the inferior concha 102 may be too large, i.e., the opening of the formed quasi-cavity may be too large, resulting in a smaller listening index. In some embodiments, in order to make the open earphone have a better listening index when the open earphone is worn, the angle between the long-axis direction Y and the sagittal axis direction of the human body may be in a range of 15° to 60°. In some embodiments, in order to further improve the sound leakage reduction effect, the angle between the long-axis direction Y and the sagittal axis direction of the human body may be in a range of 20° to 50°. In some embodiments, in order to have a proper distance between the sound outlet and the external auditory canal 101, the angle between the long-axis direction Y and the sagittal axis direction of the human body may be in a range of 23° to 46°.

In some embodiments, the direction of the clamping force may be a direction of a line connecting two clamping points (or a central point of a clamping surface) of the open earphone clamped on both sides of the auricle. When the shape and the dimension of the sound production component 11 are constant, the direction of the clamping force may be closely related to an orientation of the sound production component 11 in the inferior concha 102 and a depth of the sound production component 11 extending into the inferior concha 102. In addition, in order to make the open earphone more stable to wear, the direction of the clamping force should be kept the same as or substantially the same as a direction of a pressure exerted by the sound production component 11 on the inferior concha 102 and a direction of a pressure exerted by the ear hook clamping point EP on the back of the ear to avoid the tendency of relative movement between the sound production component 11 and the ear hook 12. Therefore, the direction of the clamping force may also affect the wearing stability of the open earphone. Since regions of the back of the ear 100 opposite to the inferior concha 102 are limited, and the direction of the pressure of the ear hook 12 on the ear 100 in these regions is usually parallel or roughly parallel to the sagittal plane of the user, an angle between the direction of the clamping force and the sagittal plane of the user may keep in a certain range. In other words, the direction of the clamping force may be parallel or substantially parallel to the sagittal plane of the user. If the aforementioned angle deviates too much from 0°, a gap between the inner side surface IS of the sound-generating part 11 and the inferior concha 102 may be too large, resulting in a smaller listening index; or the position of the sound production component 11 in the inferior concha 102 may deviate toward the side of the ear 100 toward the head, the inner side surface IS on the sound production component 11 may be attached to the upper edge of the inferior concha 102, and the gap between the inner side surface IS of the sound production component 11 and the inferior concha 102 may be too small (or the count of the gaps may be too small), or even the internal environment may be completely sealed and isolated from the external environment, resulting in a poor sound leakage reduction effect. In addition, if the aforementioned angle deviates too much from 0°, the wearing stability of the open earphone 10 may be poor, and shaking may easily occur. It should be noted that the direction of the clamping force may be determined by affixing a force sensor (e.g., a strain gauge) or a force sensor array on the side of the auricle toward the head and the side of the auricle away from the head, and reading a force distribution at a clamped position. For example, if there is a point where the force may be measured on the side of the auricle toward the head and the side of the auricle away from the head, it can be considered that the direction of the clamping force may be the direction of the line connecting the two points. In some embodiments, in order to meet wearing requirements, an angle between the direction of the clamping force and the sagittal plane of the user may be in a range of −30° to 30°. In some embodiments, in order to improve the listening index, the angle between the direction of the clamping force and the sagittal plane of the user may be in a range of −20° to 20°. In some embodiments, in order to further improve the sound leakage reduction effect, the angle between the direction of the clamping force and the sagittal plane of the user may be in a range of −10° to 10°. In some embodiments, in order to further increase the wearing stability of the open earphone 10, the angle between the direction of the clamping force and the sagittal plane of the user may be in a range of −8° to 8°. In some embodiments, the direction of the clamping force may be adjusted by designing a curve configuration of the ear hook 12, and/or designing the shape and the dimension of the sound production component 11, and/or designing the position of the clamping region center CC.

In order to further measure the clamping force provided by the ear hook 12 in the wearing state, a degree of difficulty of deformation of the ear hook 12 based on the clamping fulcrum CP may be defined as a clamping coefficient based on the clamping fulcrum CP in the present disclosure. In some embodiments, a value the clamping coefficient of the ear hook 12 based on the clamping fulcrum CP may keep in a certain range. If the above-mentioned clamping coefficient is too large, the clamping force may be too large during wearing, the user's ear 100 may feel a strong pressure, and a wearing position may be difficult to adjust after wearing. Besides, the upper side surface US of the sound production component 11 may be attached to the upper edge of the inferior concha 102, and the gap between the sound production component 11 and the inferior concha 102 may be too small (or the count of the gaps may be too small), resulting in a poor sound leakage reduction effect. If the aforementioned clamping coefficient is too small, the wearing of the ear hook 12 may not be stable enough, the sound production component 11 may be easily separated from the auricle, and the gap between the sound production component 11 and the inferior concha 102 may be too large, i.e., the opening of the formed quasi-cavity may be too large, resulting in a smaller listening index. In some embodiments, in order to meet the wearing requirements, the value of the clamping coefficient of the ear hook 12 based on the clamping fulcrum CP may be in a range of 10 N/m to 30 N/m. In some embodiments, in order to increase the adjustability after wearing, the value of the clamping coefficient of the ear hook 12 based on the clamping fulcrum CP may be in a range of 11 N/m to 26 N/m. In some embodiments, in order to increase the stability after wearing, the value of the clamping coefficient of the ear hook 12 based on the clamping fulcrum CP may be in a range of 15 N/m to 25 N/m. In some embodiments, in order to make the open earphone have a better listening index when the open earphone is worn, the value of the clamping coefficient of the ear hook 12 based on the clamping fulcrum CP may be in a range of 17 N/m to 24 N/m. In some embodiments, in order to further improve the sound leakage reduction effect, the value of the clamping coefficient of the ear hook 12 based on the clamping fulcrum CP may be in a range of 18 N/m to 23 N/m. The clamping coefficient of the ear hook 12 based on the clamping fulcrum CP may reflect a degree of difficulty of stretching the sound production component 11 away from the ear hook 12. In some embodiments, the clamping coefficient of the ear hook 12 based on the clamping fulcrum CP may be expressed as, in the wearing state, a relationship between a distance between the sound production component 11 and the ear hook 12 and a force generated by the ear hook 12 that drives the sound production component 11 to close to the first portion of the ear hook. It should be noted that the distance between the sound production component 11 and the ear hook 12 may be a change in the distance between the sound production component 11 and the ear hook 12 in the long-axis direction Y of the sound production component from the non-wearing state to the wearing state; the value range of the clamping coefficient of the ear hook 12 based on the clamping fulcrum CP may be determined by an exemplary process below, the ear hook 12 may be equivalent to a spring, and a specific relationship between a stretching distance of the spring and the clamping force is shown in formula (1):

$$F=kx \tag{1},$$

where F represents the clamping force, k represents the clamping coefficient, and x represents the stretching distance.

Based on the above formula (1), the clamping coefficient may be determined by the following process: clamping forces corresponding to different stretching distances are measured by a tension meter, and at least one set of clamping force and stretching distance are determined. At least one intermediate clamping coefficient may be determined by substituting at least one set of clamping force and corresponding stretching distance into formula (1). An average value of the at least one intermediate clamping coefficient is then calculated and used as the clamping coefficient. Alternatively, the clamping force may be determined by measuring a clamping force for stretching the distance in a normal wearing state by the tension meter. The clamping coefficient may be determined by substituting the clamping force and the stretching distance into the formula (1).

In some embodiments, in the wearing state, the ear hook 12 may generate the clamping force for driving the sound production component 11 to be close to the first portion of the ear hook, and the clamping force may keep in a certain range. It should be noted that the clamping force refers to a clamping force corresponding to a preset stretching distance measured by the tension meter, and the preset distance may be a distance under the standard wearing condition; the clamping force may also be determined by attaching the force sensor (e.g., the strain gauge) or the force sensor array to both the side of the auricle toward the head and the side of the auricle away from the head, and reading a value of the force of the clamped position of the auricle. For example, if forces are measurable at two points corresponding to the same position on the side of the auricle toward the head and the side of the auricle away from the head, the force (e.g., any of the two forces) may be measured as the clamping force. If the aforementioned clamping force is too small, the ear hook 12 and the sound production component 11 may not be effectively clamped on the front and rear sides of the ear 100 in the wearing state, resulting in poor wearing stability. When the sound production component 11 cannot effectively clamp the inferior concha 102, the gap between the sound production component 11 and the inferior concha 102 may be too large, i.e., the opening of the formed quasi-cavity may be too large, resulting in a smaller hearing index. If the aforementioned clamping force is too large, the open earphone 10 may exert a strong pressure on the user's ear 100 in the wearing state, making the open earphone 10 difficult to adjust the wearing position after wearing. Moreover, if the aforementioned clamping force is too large, the pressure of the sound production component 11 on the inferior concha 102 may be too large, which may increase the tendency of the sound production component 11 to rotate around the clamping fulcrum CP, the clamping region of the sound production component 11 may slide toward the position of the clamping fulcrum CP, and then the sound production component 11 may not be located in an expected position in the inferior concha 102, i.e., the side wall of the sound production component 11 may be attached to the upper edge of the inferior concha 102, the gap between the side wall of the sound production component 11 and the inferior concha 102 may be too small (or the count of the gaps may be too small), resulting in poor sound leakage reduction effect. In some embodiments, in order to meet the wearing requirements, the value of the clamping force generated by the ear hook 12 to drive the sound production component 11 to be close to the first portion of the ear hook may be in a range of 0.03 N to 1 N. In some embodiments, in order to increase the adjustability after wearing, the value of the clamping force generated by the ear hook 12 to drive the sound production component 11 to be close to the first portion of the ear hook may be in a range of 0.05 N to 0.8 N. In some embodiments, in order to increase the stability after wearing, the value of the clamping force generated by the ear hook 12 to drive the sound production component 11 to be close to the first portion of the ear hook may be in a range of 0.2 N to 0.75 N. In some embodiments, in order to make the open earphone have a better listening index in the wearing state, the value of the clamping force generated by the ear hook 12 to drive the sound production component 11 to be close to the first portion of the ear hook may be in a range of 0.3 N to 0.7 N. In some embodiments, in order to further improve the sound leakage reduction effect, the value of the clamping force generated by the ear hook 12 to drive the sound production component 11 to be close to the first portion of the ear hook may be in a range of 0.35 N to 0.6 N.

In some embodiments, in the non-wearing state, a minimum distance between the sound production component 11 and the first portion of the ear hook may keep in a certain range. It should be noted that the minimum distance between the sound production component 11 and the first portion of the ear hook refers to a minimum distance between a region of the sound production component 11 clamped on both sides of the user's auricle (i.e., the clamping region) and a region of the first portion of the ear hook (i.e., a region near the ear hook clamping point EP). In some embodiments, for ease of description, the minimum distance between the sound production component 11 and the first portion of the ear hook may be understood as a distance between the clamping region center CC and the ear hook clamping point EP. If the minimum distance is too large, the ear hook 12 may not be effectively clamped on both sides of the ear 100 after wearing (i.e., the wearing stability may be poor), and the gap between the sound production component 11 and the inferior concha 102 may be too large, i.e., the opening of the formed quasi-cavity may be too large, resulting in a smaller listening index. In some embodiments, in order to make the open earphone have a better listening index in the wearing state, the minimum distance between the sound production component 11 and the first portion of the ear hook may not be greater than 3 mm in the non-wearing state. In some embodiments, in order to increase the stability after wearing, the minimum distance between the sound production component 11 and the first portion of the ear hook may not be greater than 2.6 mm in the non-wearing state. In some embodiments, in order to make the quasi-cavity structure formed by the sound production component 11 and the inferior concha 102 have a more suitable opening size, the minimum distance between the sound production component 11 and the first portion of the ear hook may not be greater than 2.2 mm in the non-wearing state.

In some embodiments, in the wearing state, the minimum distance between the sound production component 11 and the first portion of the ear hook may keep in a certain range. If the minimum distance is too small, the open earphone 10 may exert a strong pressure on the user's ear 100 in the wearing state, the wearing position may not be easily adjusted after wearing, the side wall of the sound production component 11 may be attached to the upper edge of the inferior concha 102, the gap between the side wall of the sound production component 11 and the inferior concha 102 may be too small (or the count of the gaps may be too small), resulting in poor sound leakage reduction effect. In some embodiments, in order to meet wearing requirements, the minimum distance between the sound production component 11 and the first portion of the ear hook may not be less than 2 mm in the wearing state. In some embodiments, in order to improve the sound leakage reduction effect, the minimum distance between the sound production component 11 and the first portion of the ear hook may not be less than 2.5 mm in the wearing state. In some embodiments, in order to further increase the adjustability after wearing, the minimum distance between the sound production component 11 and the first portion of the ear hook may not be less than 2.8 mm in the wearing state.

In some embodiments, the open earphone 10 may include the wearing state and the non-wearing state, and a difference between the minimum distance between the sound production component 11 and the first portion of the ear hook in the wearing state and the minimum distance between the sound production component 11 and the first portion of the ear hook in the non-wearing state may keep in a certain range. It should be noted that the difference between the minimum distances in the wearing state and the non-wearing state may correspond to the distance. If the aforementioned difference is too small, according to the formula (1), the clamping force may be too small, the open earphone may not be effectively clamped on both sides of the ear 100 after wearing, the gap between the sound production component 11 and the inferior concha 102 may be too large, i.e., the opening of the formed quasi-cavity is too large, resulting in a smaller listening index. In some embodiments, in order to make the open earphone have a better listening index in the wearing state, the distance between the minimum distance between the sound production component 11 and the first portion of the ear hook in the wearing state and the minimum distance between the sound production component 11 and the first portion of the ear hook in the non-wearing state may not be less than 1 mm. In some embodiments, in order to increase the stability after wearing, the distance between the minimum distance between the sound production component 11 and the first portion of the ear hook in the wearing state and the minimum distance between the sound production component 11 and the first portion of the ear hook in the non-wearing state may not be less than 1.3 mm. In some embodiments, in order to make the quasi-cavity structure formed by the sound production component 11 and the inferior concha 102 have a more suitable opening size, the distance between the minimum distance between the sound production component 11 and the first portion of the ear hook in the wearing state and the minimum distance between the sound production component 11 and the first portion of the ear hook in the non-wearing state may not be less than 1.5 mm.

In some embodiments, after the clamping coefficient of the clamping fulcrum CP is determined, in the non-wearing state, an angle between a first connection line from the clamping region center CC to the clamping fulcrum CP and a second connection line from the ear hook clamping point EP to the clamping fulcrum CP may keep in a certain range, so that the open earphone may provide a suitable clamping force to the ear 100 in the wearing state, and make the sound production component 11 be located at the expected position in the inferior concha 102. When the clamping coefficient of the clamping fulcrum CP and the shape and the dimension of the sound production component 11 are constant, if the aforementioned angle is too large, the ear hook 12 may not be effectively clamped on both sides of the ear 100 after wearing, the gap between the sound production component 11 and the inferior concha 102 may be too large, i.e., the opening of the formed quasi-cavity may be too large, resulting in a smaller listening index. When the clamping coefficient of the clamping fulcrum CP and the shape and the dimension of the sound production component 11 are constant, if the aforementioned angle is too small, a difference between the angle between the connection lines in the wearing state and the angle between the connection lines in the wearing state may be too large, then the clamping force of the ear hook 12 to the ear 100 in the wearing state may be too large, causing the open earphone 10 to exert a strong pressure on the user's ear 100 in the wearing state, and making it difficult to adjust the wearing position after wearing. Besides, the side wall of the sound production component 11 may be attached to the upper edge of the inferior concha 102, and the gap between the side wall of the sound production component 11 and the inferior concha 102 may be too small (or the count of the gaps may be too small), resulting in a poor sound leakage reduction effect. In some embodiments, in order to meet the wearing requirements, in the non-wearing state, the angle between the first connection line from the clamping region center CC to the clamping fulcrum CP and the second connection line from the ear hook clamping point EP to the clamping fulcrum CP may be in a range of 3° to 9°. In some embodiments, in order to increase the adjustability after wearing, in the non-wearing state, the angle between the first connection line from the clamping region center CC to the clamping fulcrum CP and the second connection line from the ear hook clamping point EP to the clamping fulcrum CP may be in a range of 3.1°-8.4°. In some embodiments, in order to increase the stability after wearing, in the non-wearing state, the angle between the first connection line from the clamping region center CC to the clamping fulcrum CP and the second connection line from the ear hook clamping point EP to the clamping fulcrum CP may be in a range of 3.8° to 8°. In some embodiments, in order to make the open earphones have a better listening index in the wearing state, in the non-wearing state, the angle between the first connection line from the clamping region center CC to the clamping fulcrum CP and the second connection line from the ear hook clamping point EP to the clamping fulcrum CP may be in a range of 4.5° to 7.9°. In some embodiments, in order to further improve the sound leakage reduction effect, in the non-wearing state, the angle between the first connection line from the clamping region center CC to the clamping fulcrum CP and the second connection line from the ear hook clamping point EP to the clamping fulcrum CP may be in a range of 4.6° to 7°.

In some embodiments, when the clamping coefficient of the clamping fulcrum CP and the shape and the dimension of the open earphone 10 are determined, in the wearing state, the angle between the first connection line from the clamping region center CC to the clamping fulcrum CP and the second connection line from the ear hook clamping point EP to the clamping fulcrum CP may keep in a certain range, so as to provide a suitable clamping force to the ear 100, and make the sound production component 11 be located at the expected position in the inferior concha 102. When the clamping coefficient of the clamping fulcrum CP and the shape and the dimension of the open earphone 10 are constant, if the aforementioned angle is too small, the open earphone 10 may exert a strong pressure on the user's ear 100 in the wearing state, and make it difficult to adjust the wearing position after wearing. Besides, the side wall of the sound production component 11 may be attached to the upper edge of the inferior concha 102, and the gap between the side wall of the sound production component 11 and the inferior concha 102 may be too small (or the count of the gaps may be too small), resulting in a poor sound leakage reduction effect. When the clamping coefficient of the clamping fulcrum CP and the shape and the dimension of the open earphone 10 are constant, if the aforementioned angle is too large, the ear hook 12 may not be effectively clamped on both sides of the ear 100 after wearing, and the gap between the sound production component 11 and the inferior concha 102 may be too large, i.e., the opening of the formed quasi-cavity may be too large, resulting in a smaller listening index. In some embodiments, in order to meet the wearing requirements, in the wearing state, the angle between the first connection line from the clamping region center CC to the clamping fulcrum CP and the second connection line from the ear hook clamping point EP to the clamping fulcrum CP may be in a range of 6° to 12°. In some embodiments, in order to increase the adjustability after wearing, in the wearing state, the angle between the first connection line from the clamping region center CC to the clamping fulcrum CP and the second connection line from the ear hook clamping point EP to the clamping fulcrum CP may be in a range of 6.3° to 10.8°. In some embodiments, in order to increase the stability after wearing, in the wearing state, the angle between the first connection line from the clamping region center CC to the clamping fulcrum CP and the second connection line from the ear hook clamping point EP to the clamping fulcrum CP may be in a range of 7° to 10.5°. In some embodiments, in order to make the open earphone have a better listening index in the wearing state, in the wearing state, the angle between the first connection line from the clamping region center CC to the clamping fulcrum CP and the second connection line from the ear hook clamping point EP to the clamping fulcrum CP may be in a range of 7.3° to 10°. In some embodiments, in order to further improve the sound leakage reduction effect, in the wearing state, the angle between the first connection line from the clamping region center CC to the clamping fulcrum CP and the second connection line from the ear hook clamping point EP to the clamping fulcrum CP may be in a range of 8° to 9.8°.

In some embodiments, the open earphone 10 may include the wearing state and the non-wearing state, and a difference between the angle between the connection lines in the wearing state and the angle between the connection lines in the non-wearing state may keep within a certain range. It should be noted that the angle between the connection lines in the wearing state may be the angle between the first connection line from the clamping region center CC to the clamping fulcrum CP and the second connection line from the ear hook clamping point EP to the clamping fulcrum CP in the wearing state; and the angle between the connection lines in the non-wearing state may be the angle between the first connection line from the clamping region center CC to the clamping fulcrum CP and the second connection line from the ear hook clamping point EP to the clamping fulcrum CP in the non-wearing state. When the clamping coefficient of the clamping fulcrum CP is constant, if the aforementioned difference is too small, the clamping force may be too small, the ear hook may not be effectively clamped on both sides of the ear 100 after wearing, and the gap between the sound production component 11 and the inferior concha 102 may be too large, i.e., the opening of the formed quasi-cavity may be too large, resulting in a smaller listening index. When the clamping coefficient of the clamping fulcrum CP is constant, if the above-mentioned difference is too large, the clamping force may be too large, the open earphone 10 may exert a strong pressure on the user's ear 100 in the wearing state, and make it difficult to adjust the wearing position after wearing. Besides, the side wall of the sound production component 11 may be attached to the upper edge of the inferior concha 102, and the gap between the side wall of the sound production component 11 and the inferior concha 102 may be too small (or the count of the gaps may be too small), resulting in a poor sound leakage reduction effect. In some embodiments, in order to meet the wearing requirements, the difference between the angle between the connection lines in the wearing state and the angle between the connection lines in the non-wearing state may be in a range of 2° to 4°. In some embodiments, in order to increase the adjustability after wearing, the difference between the angle between the connection lines in the wearing state and the angle between the connection lines in the non-wearing state may be in a range of 2.1° to 3.8°. In some embodiments, in order to increase the stability after wearing, the difference between the angle between the connection lines in the wearing state and the angle between the connection lines in the non-wearing state may be in a range of 2.3° to 3.7°. In some embodiments, in order to make the open earphone have a better listening index in the wearing state, the difference between the angle between the connection lines in the wearing state and the angle between the connection lines in the non-wearing state may be in a range of 2.5° to 3.6°. In some embodiments, in order to further improve the sound leakage reduction effect, the difference between the angle between the connection lines in the wearing state and the angle between the connection lines in the non-wearing state may be in a range of 2.6° to 3.4°.

Figure 7:
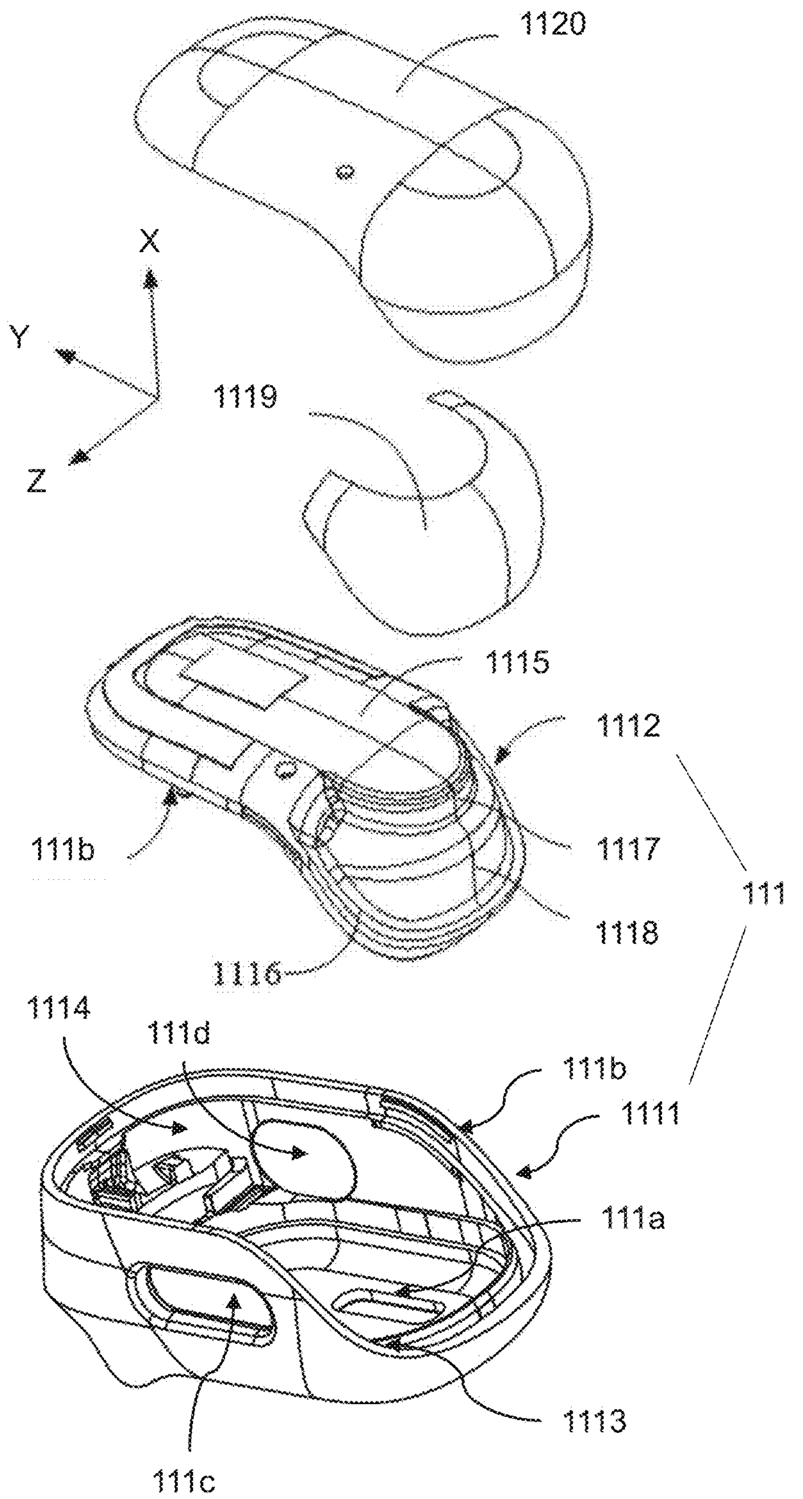
FIG. 7 is an exploded view illustrating an exemplary sound production component of the open earphone shown in FIG. 3.

As shown in FIG. 7, in some embodiments, the clamping region of the housing 111 inserted into the user's inferior concha 102 and/or the inner side of the clamping region may be provided with a flexible material. A Shore hardness of the flexible material may keep in a certain range. If the Shore hardness of the flexible material is too large, the comfort of the sound production component 11 in the wearing state may deteriorate. In some embodiments, in order to meet wearing requirements, the Shore hardness of the flexible material may be in a range of 0 HA to 40 HA. In some embodiments, in order to improve comfort, the Shore hardness of the flexible material may be in a range of 0 HA to 20 HA.

The flexible material may be a flexible insert 1119, and the hardness of the flexible insert 1119 may be less than the hardness of the housing 111. The housing 111 may be a plastic part; and the material of the flexible insert 1119 may be silicone, rubber, etc., and the flexible insert 1119 may be formed on the clamping region and/or the inner side of the clamping region by injection molding. Further, the flexible insert 1119 may at least partially cover a region of the housing 111 corresponding to the free end FE, i.e., cover the clamping region and/or the inner side of the clamping region, so that the sound production component 11 may at least partially abut against the inferior concha 102 through the flexible insert 1119. In other words, a portion of the housing 111 extending into the inferior concha 102 and in contact with the inferior concha 102 may be covered by the flexible insert 1119. In this way, when the sound production component 11 abuts against the inferior concha 102, for example, when the sound production component 11 and the suspension structure 12 are arranged to jointly clamp the ear from the front and rear sides of an ear region corresponding to the inferior concha 102 of the ear 100, the flexible insert 1119 may act as a buffer between the housing 111 and the ear 100 (e.g., the ear region) to relieve the pressure of the acoustic device 10 on the ear 100, which is conducive to improving the comfort of the acoustic device 10 in the wearing state.

In some embodiments, the flexible insert 1119 may continuously cover at least partial regions of the housing 111 corresponding to the rear side surface RS, the upper side surface US, and the lower side surface LS. For example, a region of the housing 111 corresponding to the rear side surface RS may be covered more than 90% by the flexible insert 1119, and regions of the housing 111 corresponding to the upper side surface US and the lower side surface LS may be respectively covered about 30% by the flexible insert 1119. In this way, the comfort of the acoustic device 10 in the wearing state and the need for structural components such as the transducer arranged in the housing 111 may be considered.

In some embodiments, viewed along the thickness direction X, the flexible insert 1119 may be provided in a U shape.

In some embodiments, a portion of the flexible insert 1119 corresponding to the lower side surface LS may abut against an antitragus. A thickness of a portion of the flexible insert 1119 corresponding to the rear side surface RS may be smaller than a thickness of a portion of the flexible insert 1119 corresponding to the upper side surface US and a thickness of a portion of the flexible insert 1119 corresponding the lower side surface LS, respectively, so that good comfort can also be obtained when the core module 11 abuts against an uneven position the inferior concha 102.

FIG. 7 is an exploded view illustrating an exemplary sound production component according to some embodiments of the present disclosure. In some embodiments, the housing 111 may include an inner shell 1111 and an outer shell 1112 snap-fit with each other along the thickness direction X. The inner shell 1111 may be closer to the ear 100 than the outer shell 1112 in the wearing state. A sound outlet 111*a*, a first pressure relief hole 111*c*, and a second pressure relief hole 111*d* may be disposed on the inner shell 1111. A diaphragm of the transducer may be disposed toward the inner shell 1111. A first acoustic cavity may be formed between the transducer and the inner shell 1111. A contact surface 111*b* between the outer shell 1112 and the inner shell 1111 may be inclined to a side where the inner shell 1111 is located in a direction close to the free end FE, so that the flexible insert 1119 may be arranged as much as possible in a region of the outer shell 1112 corresponding to the free end FE. For example: the whole flexible insert 1119 may be arranged in the region of the outer shell 1112 corresponding to the free end FE, so as to simplify the structure of the sound production component 11 and reduce the processing cost.

In some embodiments, a wrapping layer may be provided outside the housing 111, and the Shore hardness of the wrapping layer may keep in a certain range. If the Shore hardness is too large, the comfort of the sound production component 11 in the wearing state may deteriorate, and when a flexible coating 1120 can integrally cover at least part of an outer surface of the flexible insert 1119, the flexible insert 1119 may not achieve a proper function (e.g., relieve the pressure of the acoustic device 10 on the ear 100, and improve the comfort of the acoustic device 10 in the wearing state). If the Shore hardness is too small, the side wall of the sound production component 11 may be completely attached to the structure of the inferior concha 102, so that the internal environment may be completely sealed and isolated from the external environment, and the quasi-cavity structure may not be formed, resulting in failing to reduce the far-field sound leakage effect, and failing to shape during the assembly process. In some embodiments, in order to improve the sound leakage reduction effect, the Shore hardness of the wrapping layer may be in a range of 10 HA to 80 HA. In some embodiments, in order to improve the comfort of the sound production component 11 in the wearing state, the Shore hardness of the wrapping layer may be in a range of 15 HA to 70 HA. In some embodiments, in order to make the quasi-cavity structure formed by the sound production component 11 and the inferior concha 102 have a better opening size, the Shore hardness of the wrapping layer may be in a range of 25 HA to 55 HA. In some embodiments, in order to ensure better shaping during assembly, the Shore hardness of the wrapping layer may be in a range of 30 HA to 50 HA.

The wrapping layer may be the flexible coating 1120, and the hardness of the flexible coating 1120 may be less than that of the housing 111. The housing 111 may be a plastic part; and a material of the flexible coating 1120 may be silicone, rubber, etc., and the flexible coating 1120 may be formed on a preset region of the housing 111 by injection molding, glue connection, or the like. Further, the flexible coating 1120 may integrally cover at least part of the outer surface of the flexible insert 1119 and at least part of the outer surface of the housing 1112 not covered by the flexible insert 1119, which is conducive to enhancing the consistency of the appearance of the sound production component 11. Of course, the flexible coating 1120 may further cover the outer surface of the inner shell 1111. The hardness of the flexible insert 1119 may be smaller than that of the flexible coating 1120, thereby making the flexible insert 1119 be sufficiently soft. In addition, the flexible coating 1120 may also improve the comfort of the acoustic device 10 in the wearing state, and have a certain structural strength to protect the flexible insert 1119. Further, an area of the outer surface of the flexible insert 1119 may be between 126 $mm^2$ and 189 $mm^2$. Wherein, if the area of the outer surface of the flexible insert 1119 is too small, the comfort of the sound production component 11 in the wearing state may deteriorate; and if the area of the outer surface of the flexible insert 1119 is too large, a volume of the sound production component 11 may be too large, and an area where the flexible insert 1119 does not abut against the inferior concha 102 may be too large, which may deviate from the original intention of the flexible insert 1119. In some embodiments, the thickness of the flexible coating 1120 may be less than the thickness of the housing 1112.

In some embodiments, the inner shell 1111 may include a bottom wall 1113 and a first side wall 1114 connected with the bottom wall 1113, the outer shell 1112 may include a top wall 1115 and a second side wall 1116 connected with the top wall 1115. The second side wall 1116 and the first side wall 1114 may be snap-fit with each other along the parting surface 111*b*, and may support each other. Viewed along the short-axis direction Z, in a reference direction of the connection end CE pointing to the free end FE (e.g., an opposite direction of an arrow in the long-axis direction Y in FIG. 7), a portion of the first side wall 1114 close to the free end FE may gradually approach the bottom wall 1113 in the thickness direction X, and a portion of the second side wall 1116 close to the free end FE may be gradually away from the top wall 1115 in the thickness direction X, so that the parting surface 111*b* may be inclined to a side where the inner shell 1111 is located in a direction close to the free end FE. In this case, the flexible insert 1119 may be at least partially disposed on an outer side of the second side wall 1116. For example, referring to FIG. 7, the flexible insert 1119 may not only be disposed on the outer side of the second side wall 1116, but also partially disposed on the outer side of the top wall 1115.

In some embodiments, the housing 1112 may be provided with an insertion groove at least partially located on the second side wall 1116, and the flexible insert 1119 may be embedded in the insertion groove, so that an outer side of a region of the housing 1112 not covered by the flexible insert 1119 and an outer surface of the flexible insert 1119 may have a continuous transition. A region where the flexible insert 1119 in FIG. 7 is located may simply be regarded as the insertion groove. In this way, it is not only conducive for the flexible insert 1119 to accumulate on the outer shell 1112 during the injection molding process, avoiding the overflow of the flexible insert 1119, but also conductive to improving the appearance quality of the sound production component 11 and preventing the surface of the sound production component 11 from being bumpy.

In some embodiments, the second side wall 1116 may include a first sub-side wall segment 1117 and a second sub-side wall segment 1118 connected with the first sub-side wall segment 1117. The first sub-side wall segment 1117 may be closer to the top wall 1115 than the second sub-side wall segment 1118 in the thickness direction X, and the second sub-side wall segment 1118 may further protrude toward an outer side of the housing 111 than the first sub-side wall segment 1117. In short, the second side wall 1116 may have a stepped structure. With application of the structure, the flexible insert 1119 may be accumulated on the outer shell 1112 during the injection molding process, avoiding the overflow of the flexible insert 1119, the sound production component 11 may better abut against the inferior concha 102 through the flexible insert 1119, thereby improving the comfort of the acoustic device 10 in the wearing state.

Figure 8:
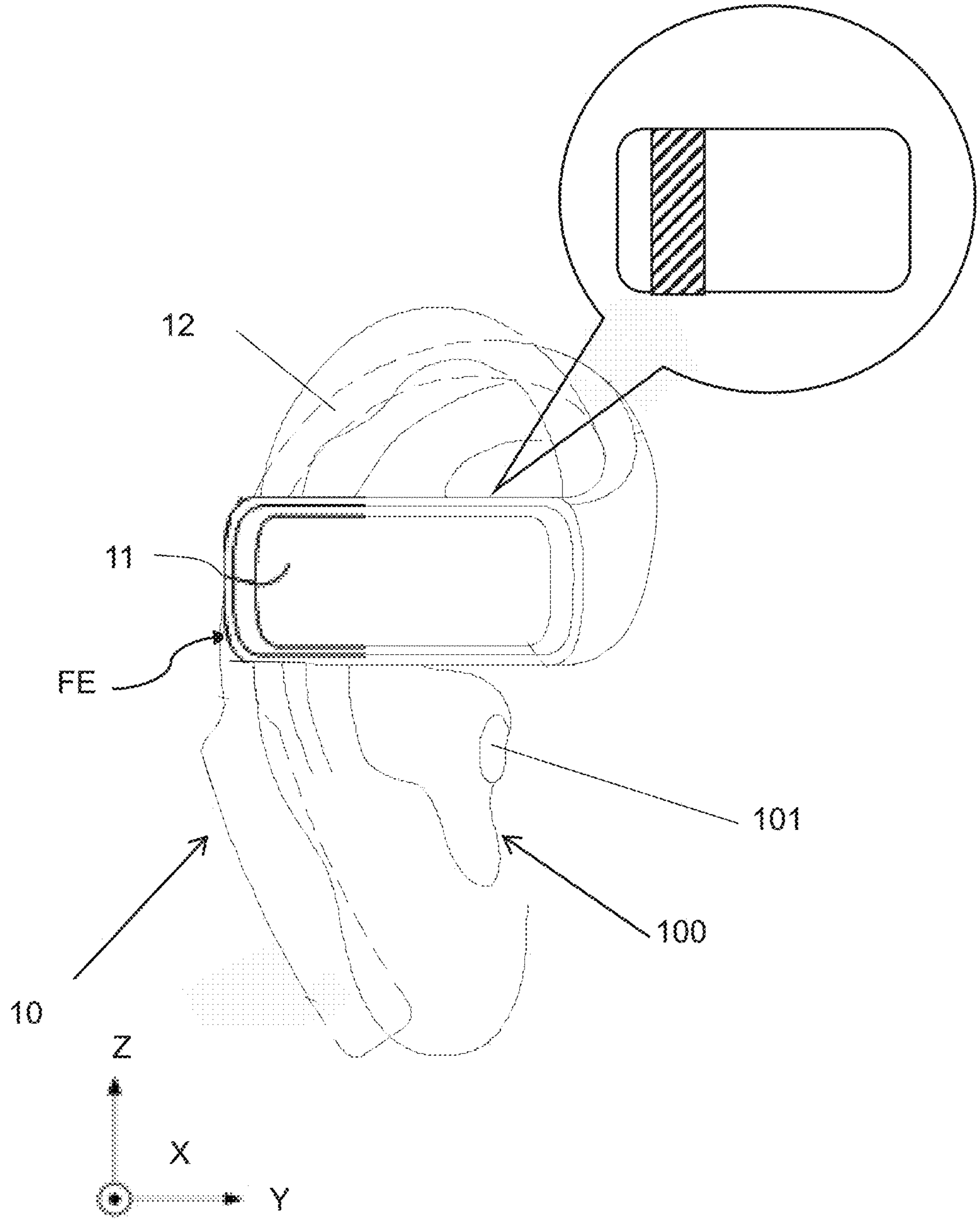
FIG. 8 is a schematic diagram illustrating another exemplary wearing of an open earphone according to some embodiments of the present disclosure.

The open earphone 10 will be described in detail by taking the open earphone 10 shown in FIG. 8 as an example. It should be known that, without violating the corresponding acoustic principles, the structure of the open earphone 10 in FIG. 8 and corresponding parameters thereof may also be applied to the open earphones of other configurations mentioned above.

Figure 9:
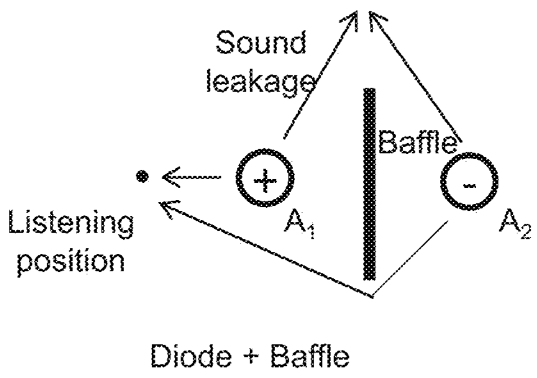
FIG. 9 is a schematic diagram illustrating an exemplary distribution of baffle structures arranged between two sound sources of double sound sources according to some embodiments of the present disclosure.

The output effect of the open earphone can be improved by arranging the sound production component 11 at least partially at the antihelix 105 of the user, i.e., a sound intensity at a near-field listening position may be increased, and the volume of the far-field leakage sound may also be reduced. When the user wears the open earphone 10, one or more sound outlets may be provided on a side of the housing of the sound production component 11 near or toward the user's ear canal, and one or more pressure relief holes may be provided on another side wall of the housing of the sound production component 11 (e.g., a side wall away from or back to the user's ear canal). The sound outlets may be acoustically coupled with a front cavity of the open earphone 10 and the pressure relief holes may be acoustically coupled with a rear cavity of the open earphone 10. Taking the sound production component 11 including a sound outlet and a pressure relief hole as an example, sound output by the sound outlet and sound output by the pressure relief hole may be approximately regarded as two sound sources, and sound waves of the two sound sources may be in opposite phases. The sound output by the sound outlet may be directly transmitted to the opening of the user's ear canal without hindrance, while the sound output by the pressure relief hole may bypass the housing of the sound production component 11 or pass through a gap formed between the sound production component 11 and the antihelix 105. In this case, the sound production component 11 and the antihelix 105 may form a structure similar to a baffle (the antihelix 105 may be equivalent to a baffle), wherein a sound source corresponding to the sound outlet may be located on one side of the baffle, and a sound source corresponding to the pressure relief hole may be located on another side of the baffle, thereby forming the acoustic model shown in FIG. 9. As shown in FIG. 9, when the baffle is provided between a point sound source A1 and a point sound source A2, in the near-field, a sound field of the point sound source A2 needs to bypass the baffle to interfere with a sound wave of the point sound source A1 at the listening position, which is equivalent to an increase in a sound path from the point sound source A2 to the listening position. Therefore, assuming that the point sound source A1 and the point sound source A2 have the same amplitude, an amplitude difference between the sound waves of the point sound source A1 and the point sound source A2 at the listening position may increase compared to the case without the baffle, thus reducing a degree of cancellation of the two sounds at the listening position and making the volume at the listening position increase. In the far field, since the sound waves generated by the point sound source A1 and the point sound source A2 may interfere without bypassing the baffle in a large spatial area (similar to the case without the baffle), the sound leakage in the far-field may not increase significantly compared to the case without the baffle. Therefore, the baffle structure around one of the point sound sources A1 and A2 may significantly increase the volume of the near-field listening position without significantly increasing the volume of the far-field sound leakage.

In some embodiments, the sound production component 11 may include a transducer and a housing accommodating the transducer. The housing may be at least partially located at the antihelix 105 of the user, and a side of the housing toward the antihelix 105 of the user may include a clamping region in contact with the antihelix 105 of the user. Since the distance of the sound production component 11 relative to an ear hook plane in the thickness direction X is enlarged after wearing, the sound production component 11 may tend to approach the ear hook plane, thereby forming clamping in the wearing state. In some embodiments, an orthographic projection of the ear hook 12 on a reference plane (e.g., the YZ plane in FIG. 8) perpendicular to the thickness direction X may partially overlap with an orthographic projection of a middle section or a middle front section of the sound production component 11 on the same reference plane (as shown in a shaded portion of the housing toward a side of the antihelix 105 of the user in the figure), thereby forming a projection overlapped region. The projection overlapped region formed by the orthographic projection of the ear hook 12 on the reference plane and the orthographic projection of the free end FE on the same reference plane may be located on a side toward the antihelix 105 of the user. In this way, not only the sound production component 11 and the ear hook 12 may jointly clamp the ear 100 from the side of the ear 100 away from the head to the side of the ear 100 toward the head, but also the formed clamping force may be mainly expressed as compressive stress, which is conducive to improving the stability and the comfort of the acoustic device 10 in the wearing state. It should be noted that the above clamping region refers to a region clamping the anti-helix 105. However, different users may have individual differences, resulting in different shapes, dimensions, etc., of ears. In the actual wearing state, the clamping region may not necessarily hold the antihelix 105.

In some embodiments, the angle between the direction of the clamping force and the sagittal plane of the user may keep in a certain range. For example, the direction of the clamping force may be perpendicular or substantially perpendicular to the sagittal plane of the user. If the angle deviates too much from 90°, the baffle structure may not be formed between the sound outlet and the pressure relief hole (e.g., the side of the housing where the pressure relief hole is located is tilted, and the antihelix 105 may not block the pressure relief hole to the other side of the sound outlet), the volume of the near-field listening position cannot be increased, and the free end FE or the battery compartment may press the ear 100. It should be noted that the direction of the clamping force may be obtained by affixing a patch (i.e., a force sensor) or a patch array on the side of the auricle toward the head and the side of the auricle away from the head, and reading a force distribution at the clamped position. For example, if there is a point where the force can be measured on the side of the auricle toward the head and a point on the side of the auricle away from the head, it can be considered that the direction of the clamping force may be a direction of a line connecting the two points. In some embodiments, in order to meet wearing requirements, the angle between the direction of the clamping force and the sagittal plane of the user may be in a range of 60° to 120°. In some embodiments, in order to increase the volume at the near-field listening position, the angle between the direction of the clamping force and the sagittal plane of the user may be in a range of 80° to 100°. In some embodiments, in order to further make the open earphone fit the antihelix 105 better in the wearing state, the angle between the direction of the clamping force and the sagittal plane of the user may be in a range of 70° to 90°.

In some embodiments, in the wearing state, the housing and the first portion of the ear hook may clamp the user's auricle, and the clamping force provided to the user's auricle may keep in a certain range. It should be noted that the clamping force may be measured by a tension meter. For example, the housing of the sound production component 11 in the non-wearing state may be separated from the ear hook 12 by a preset distance according to a wearing mode, and a pulling force in this case may be equal to the clamping force; and the clamping force may also be achieved by fixing the patch to the ear of the wearer. If the clamping force is too small, the baffle structure may not be formed between the sound outlet and the pressure relief hole (e.g., the sound production component 11 may be loose, and the antihelix 105 may not block the pressure relief hole to the other side of the sound outlet, i.e., the height of the baffle in FIG. 9 is reduced), causing that the volume of the near-field listening position may not be increased, and the wearing stability of the open earphone 10 may be poor; and if the clamping force is too large, the open earphone may exert a strong pressure on the ear 100, making the open earphone 10 less adjustable after wearing. In some embodiments, in order to meet the wearing requirements, in the wearing state, the housing and the first portion of the ear hook 12 may clamp the user's auricle, and provide a clamping force of 0.03 N-3 N to the user's auricle. In some embodiments, in order to increase the adjustability after wearing, in the wearing state, the housing and the first portion of the ear hook may clamp the user's auricle, and provide a clamping force of 0.03 N-1 N to the user's auricle. In some embodiments, in order to increase the volume of the near-field listening position, in the wearing state, the housing and the first portion of the ear hook may clamp the user's auricle, and provide a clamping force of 0.4 N-0.9 N to the user's auricle.

Figure 10:
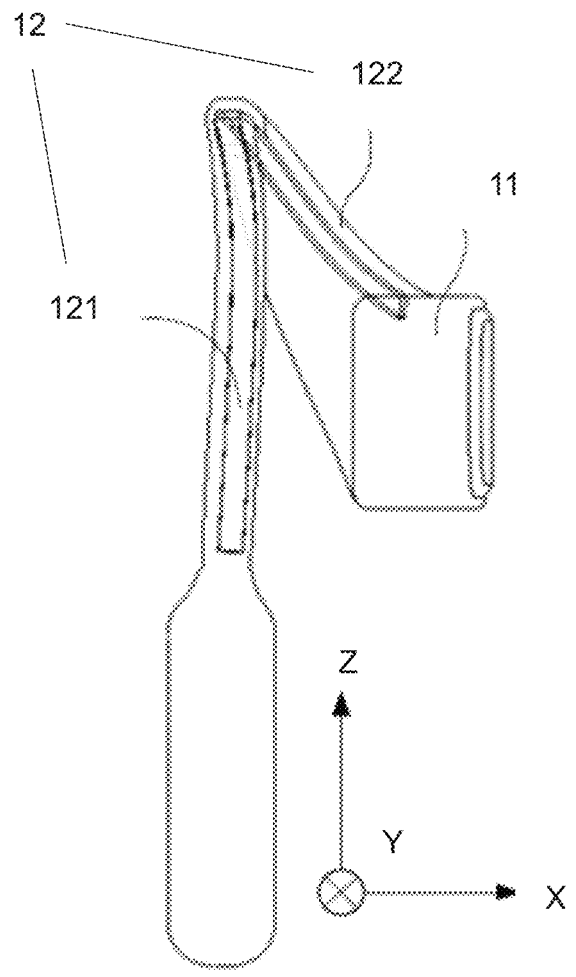
FIG. 10 is a perspective view illustrating a portion of the components of an exemplary acoustic device according to some embodiments of the present disclosure.

FIG. 10 is a perspective view illustrating a portion of components of an exemplary acoustic device according to some embodiments of the present disclosure.

In some embodiments, as shown in FIG. 10, the ear hook 12 of the open earphone 10 may be composed of a metal wire 121 and a wrapping layer 122. The metal wire 121 may play a role of supporting and clamping, and the wrapping layer 122 may wrap the outer side of the metal wire 121, making the ear hook 12 softer and fit better with the auricle, thereby improving user comfort.

The open earphone 10 will be described in detail by taking the open earphone 10 shown in FIG. 8 as an example. It should be known that, without violating the corresponding acoustic principles, the structure of the open earphone 10 in FIG. 8 and corresponding parameters thereof may also be applied to the open earphones of other configurations mentioned above.

In some embodiments, the metal wire 121 may include a spring steel, a titanium alloy, a titanium-nickel alloy, chrome-molybdenum steel, an aluminum alloy, a copper alloy, or the like, or a combination thereof. In some embodiments, parameters such as the count, the shape, the length, the thickness, and the diameter of the metal wire 121 may be set according to actual needs (e.g., the diameter of the acoustic device, strength requirements for the acoustic device, etc.). The shape of the metal wire 121 may include any suitable shape, for example, a cylinder, a cube, a cuboid, a prism, an elliptical cylinder, or the like.

Figure 11:
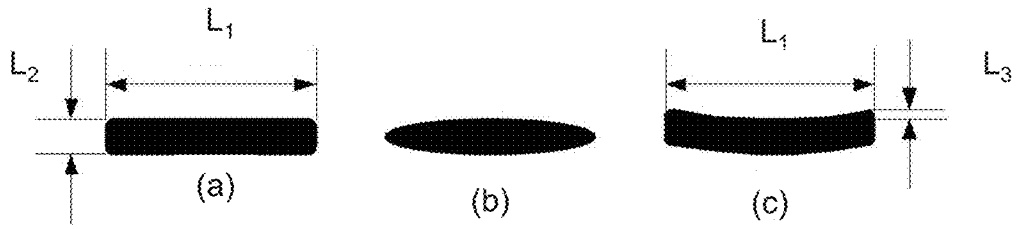
FIG. 11 is a cross-sectional view illustrating an exemplary metal wire according to some embodiments of the present disclosure.

FIG. 11 is a cross-sectional view illustrating an exemplary wire according to some embodiments of the present disclosure. As shown in FIG. 11, a metal wire 121 may have a flat structure, so that the metal wire 121 may have different deformability in various directions. In some embodiments, the cross-sectional shape of the metal wire 121 may include a square, a rectangle, a triangle, a polygon, a circle, an ellipse, an irregular shape, or the like. As shown in picture (a) in FIG. 11, the cross-sectional shape of the metal wire 121 may be a rounded rectangle. As shown in picture (b) in FIG. 11, the cross-sectional shape of the metal wire 121 may be an ellipse. In some embodiments, the length of a long side (or a long axis, L1) and/or a short side (or a short axis, L2) of the metal wire 121 may be set according to actual needs (e.g., a diameter of an acoustic device including the metal wire 121). In some embodiments, the ratio of the long side to the short side of the metal wire 121 may be in a range of 1.1:1-2:1. In some embodiments, the ratio of the long side to the short side of the metal wire 121 may be 1.5:1.

In some embodiments, the metal wire 121 may form a specific shape by stamping, pre-bending and other processes. Merely by way of example, an initial state of the metal wire 121 of the ear hook 12 of the acoustic device (i.e., a state before being processed) may be curled, straightened, and then stamped to make the metal wire 121 arc-shaped in the short-axis direction (as shown in picture (c) in FIG. 11), so that the metal wire 121 may store a certain amount of internal stress and maintain the flat shape to become a "memory metal wire". When subjected to a small external force, the metal wire 121 may return to the curled shape, so that the ear hook 12 of the acoustic device may fit and wrap around the human ear. In some embodiments, a ratio of an arc height (L3 shown in FIG. 11) of the metal wire 121 to the long side of the metal wire 121 may be in a range of 0.1 to 0.4. In some embodiments, the ratio of the arc height of the metal wire 121 to the long side of the metal wire 121 may be in the range of 0.1 to 0.35. In some embodiments, the ratio of the arc height of the metal wire 121 to the long side of the metal wire 121 may be in the range of 0.15 to 0.3. In some embodiments, the ratio of the arc height of the metal wire 121 to the long side of the metal wire 121 may be in the range of 0.2 to 0.35. In some embodiments, the ratio of the arc height of the metal wire 121 to the long side of the metal wire 121 may be in the range of 0.25 to 0.4. By arranging the metal wire 121, rigidities of the components of the acoustic device along a length direction of the acoustic device may be improved, and the holding effectiveness of the acoustic device (e.g., the ear hook 12) to the ear 100 of the user may be improved. In addition, after processing, the metal wire 121 of the ear hook 12 may be bent in the length direction of the ear hook 12 to have a strong elasticity, thereby further improving the pressing and holding effectiveness of the ear hook 12 to the ear 100 or the head of the user.

In some embodiments, the elastic modulus of the metal wire 121 may be obtained according to GB/T 24191-2009/ISO 12076:2002. In some embodiments, the elastic modulus of the metal wire 121 may keep in a certain range. When the shape and the dimension of the open earphones 10 are constant, if the elastic modulus is too large, the ear hook 12 may not easily deform, making it difficult for the user to adjust a wearing angle of the ear hook 12. When the shape and the dimension of the open earphone 10 are constant, if the elastic modulus is too small, the ear hook 12 may easily deform, so that the ear hook 12 may not be effectively clamped on both sides of the ear 100 after wearing. In some embodiments, in order to make the ear hook 12 be effectively clamped on both sides of the ear 100 after wearing, the elastic modulus of the metal wire 121 may be in a range of 20 GPa to 50 GPa. In some embodiments, in order to make the ear hook 12 easy to adjust, the elastic modulus of the metal wire 121 may be in a range of 25 GPa to 43 GPa. In some embodiments, the elastic modulus of the metal wire 121 may be in a range of 30 GPa to 40 GPa.

In some embodiments, the diameter of the metal wire 121 may keep in a certain range. It should be noted that when the cross-sectional shape of the metal wire 121 is a circle, the diameter of the metal wire 121 may be a length of a diameter of a circular cross-section of the metal wire 121; when the cross-sectional shape of the metal wire 121 is an ellipse, the diameter of the metal wire is a length of a long axis of an elliptical cross-section of the metal wire 121; and when the cross-sectional shape of the metal wire 121 is a square, a rectangle, a triangle, a polygon, an irregular shape, or the like, the diameter of the metal wire 121 may be defined as the length of a longest line segment among line segments of which two endpoints are located on the cross-section of the metal wire 121 and passing through a center of the cross section of the metal wire 121.

In some embodiments, the diameter of the metal wire 121 may keep in a certain range. When a material of the metal wire 121 and the shape and the dimension of the open earphone 10 are constant, if the aforementioned diameter is too large, the ear hook 12 may be too heavy and exert a pressure on the ear 100, a strength of the ear hook 12 may be too large, and the ear hook 12 may not easily deform, making it difficult for the user to adjust the wearing angle of the ear hook 12. When the material of the metal wire 121 and the shape and the dimension of the open earphone 10 are constant, if the aforementioned diameter is too small, the strength of the ear hook 12 may be too low, the clamping force may be too weak, and the ear hook 12 may not be effectively clamped on both sides of the ear 100 after wearing. In some embodiments, in order to prevent the ear hook 12 from exerting the pressure on the ear 100 after wearing and to facilitate the adjustment of the wearing angle, the diameter of the metal wire 121 may be in a range of 0.5 mm to 1 mm. In some embodiments, in order to increase the strength of the ear hook 12, the diameter of the metal wire 121 may be in a range of 0.6 mm to 1 mm. In some embodiments, in order to make the ear hook 12 be effectively clamped on both sides of the ear 100 after wearing, the diameter of the metal wire 121 may be in a range of 0.7 mm to 0.9 mm.

In some embodiments, the density of the metal wire 121 may keep in a certain range. If the aforementioned density is too large, the ear hook 12 may be too heavy, which may cause pressure to the ear 100. If the aforementioned density is too small, the strength of the ear hook 12 may be too low, which may make the ear hook 12 easy to damage, and low in service life. In some embodiments, in order to prevent the ear hook 12 from exerting the pressure on the ear 100 after wearing, the density of the metal wire 121 may be in a range of 5 $g/cm^3$ to 7 $g/cm^3$. In some embodiments, in order to increase the strength of the ear hook 12, the density of the metal wire 121 may be in a range of 5.5 $g/cm^3$ to 6.8 $g/cm^3$. In some embodiments, the density of the metal wire 121 may be in a range of 5.8 $g/cm^3$ to 6.5 $g/cm^3$.

In some embodiments, the wrapping layer 122 may be made of a soft material, a hard material, or the like, or a combination thereof. The soft material refers to a material with a hardness (e.g., the Shore hardness) less than a first hardness threshold (e.g., 15 A, 20 A, 30 A, 35 A, 40 A, etc.). For example, the Shore hardness of the soft material may be in a range of 45 A to 85A, and 30 D to 60D. The hard material refers to a material with a hardness (e.g., the Shore hardness) greater than a second hardness threshold (e.g., 65 D, 70 D, 75 D, 80 D, etc.). The soft material may include Polyurethanes (PU) (e.g., thermoplastic polyurethanes (TPU)), polycarbonate (PC), polyamides (PA), acrylonitrile butadiene styrene (ABS), polystyrene (PS), high impact polystyrene (HIPS), polypropylene (PP), polyethylene terephthalate (PET), polyvinyl chloride (PVC), polyurethanes (PU), polyethylene (PE), phenol formaldehyde (PF), urea-formaldehyde (UF), melamine-formaldehyde (MF), silica gel, or the like, or any combination thereof. The hard material may include polyethersulfone resin (PES), polyvinylidenechloride (PVDC), polymethylmethacrylate (PMMA), poly-ether-ether-ketone (PEEK) or the like, or any combination thereof, or any mixture with glass fibers, carbon fibers or other reinforcing agents. In some embodiments, the wrapping layer 122 may be arranged according to specific conditions. For example, the metal wire 121 may be directly covered with the soft material. As another example, the metal wire 121 may be covered with the hard material first, and then the hard material may be wrapped with the soft material. As another example, in the wearing state, a portion of the ear hook 12 in contact with the user may be made of the soft material, and a remaining portion of the ear hook 12 may be made of the hard material. In some embodiments, different materials may be formed by two-color injection molding, spraying rubber paint, or other processes. The rubber paint may include rubber paint, elastic paint, plastic elastic paint, or the like, or any combination thereof. In this embodiment, the soft material may improve the comfort of the user wearing the ear hook 12, and the hard material may improve the strength of the ear hook 12. By rationally configuring the materials of each part of the ear hook 12, it is possible to improve the strength of the ear hook 12 while improving user comfort.

In some embodiments, the Shore hardness of the wrapping layer 122 may keep in a certain range. If the aforementioned Shore hardness is too large, the comfort of the user wearing the ear hook 12 may be poor. In some embodiments, in order to increase the comfort of the user wearing the ear hook 12, the Shore hardness of the wrapping layer 122 may be in a range of 10 HA to 80 HA. In some embodiments, the Shore hardness of the wrapping layer 122 may be in a range of 15 HA to 70 HA. In some embodiments, the Shore hardness of the wrapping layer 122 may be in a range of 25 HA to 55 HA. In some embodiments, the Shore hardness of the wrapping layer 122 may be in a range of 30 HA to 50 HA.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An open earphone, comprising:

a sound production component including a transducer and a housing accommodating the transducer; and an ear hook including a first portion of the ear hook and a second portion of the ear hook, wherein the first portion of the ear hook is hung between an auricle and a head of a user, and the second portion of the ear hook extends towards a side of the auricle away from the head and connects with the sound production component to place the sound production component in a position near an ear canal but not blocking the ear canal;

the housing and the first portion of the ear hook clamp the auricle of the user, and provide a clamping force in a range of 0.03 N to 1 N to the auricle of the user.

2. The open earphone of claim 1, wherein in a wearing state, the housing is at least partially inserted into an inferior concha of the user, and a portion of the housing at least partially inserted into the inferior concha of the user includes at least one clamping region contacted with a side wall of the inferior concha of the user.

3. The open earphone of claim 2, wherein in the wearing state, an angle between a direction of a clamping force and a sagittal plane of the user is in a range of −30° to 30°.

4. The open earphone of claim 2, wherein the ear hook includes a clamping fulcrum located at a position of the ear hook with a minimum cross-sectional area, and a clamping coefficient of the ear hook based on the clamping fulcrum is in a range of 10 N/m to 30 N/m.

5. The open earphone of claim 4, wherein in the wearing state, a minimum distance between the sound production component and the first portion of the ear hook is not less than 2 mm.

6. The open earphone of claim 5, wherein in the wearing state, a distance between a center of the clamping region and the clamping fulcrum is in a range of 20 mm to 40 mm.

7. The open earphone of claim 5, wherein in the wearing state, a distance between a clamping point of the ear hook on the first portion of the ear hook and the clamping fulcrum is in a range of 25 mm to 45 mm.

8. The open earphone of claim 5, wherein in the wearing state, an angle between a first connection line from the center of the clamping region to the clamping fulcrum and a second connection line from a clamping point of the ear hook to the clamping fulcrum is in a range of 6° to 12°.

9. The open earphone of claim 2, wherein the clamping region and/or an inner side of the clamping region is provided with a flexible material, and a Shore hardness of the flexible material is in a range of 0 HA to 40 HA.

10. The open earphone of claim 1, wherein in the wearing state, the housing is at least partially located at an antihelix, and a side of the housing toward the antihelix of the user includes a clamping region contacted with the antihelix of the user.

11. The open earphone of claim 10, wherein in the wearing state, an angle between a direction of a clamping force and a sagittal plane of the user is in a range of 60° to 120°.

12. The open earphone of claim 1, wherein the ear hook is composed of a metal wire and a wrapping layer.

13. The open earphone of claim 12, wherein an elastic modulus of the metal wire is in a range of 20 GPa to 50 GPa.

14. The open earphone of claim 12, wherein a diameter of the metal wire is in a range of 0.5 mm to 1 mm.

15. The open earphone of claim 12, wherein a density of the metal wire is in a range of 5 g/cm$^3$ to 7 g/cm$^3$.

16. The open earphone of claim 12, wherein a Shore hardness of the wrapping layer is in a range of 10 HA to 80 HA.

* * * * *